US011959316B2

(12) United States Patent
Martin et al.

(10) Patent No.: US 11,959,316 B2
(45) Date of Patent: Apr. 16, 2024

(54) WAFER-TUMBLER CAM LOCKS FOR CABINETS

(71) Applicant: Olympus Lock Inc., Lynnwood, WA (US)

(72) Inventors: Christopher Martin, Lynnwood, WA (US); John Weaver, Steamboat Springs, CO (US)

(73) Assignee: OLYMPUS LOCK INC., Lynnwood, WA (US)

( * ) Notice: Subject to any disclaimer, the term of this patent is extended or adjusted under 35 U.S.C. 154(b) by 300 days.

(21) Appl. No.: 17/332,846

(22) Filed: May 27, 2021

(65) Prior Publication Data

US 2022/0381056 A1 Dec. 1, 2022

(51) Int. Cl.
*E05B 9/08* (2006.01)
*E05B 29/00* (2006.01)
*E05B 9/00* (2006.01)

(52) U.S. Cl.
CPC ............ *E05B 9/086* (2013.01); *E05B 29/004* (2013.01); *E05B 29/0066* (2013.01); *E05B 2009/006* (2013.01)

(58) Field of Classification Search
CPC . E05B 9/08; E05B 9/082; E05B 9/084; E05B 9/086; E05B 2009/006; E05B 29/00; E05B 29/004; E05B 29/0066
See application file for complete search history.

(56) References Cited

U.S. PATENT DOCUMENTS 3,503,233 A * 3/1970 Armstrong .............. E05B 9/084 70/451
4,099,397 A * 7/1978 Dauenbaugh ........... E05B 9/084 70/451
4,398,405 A * 8/1983 Patriquin ................ E05B 9/086 70/369
4,630,457 A * 12/1986 Kincaid .................. E05B 9/086 70/369
4,722,204 A * 2/1988 Foshee ................ E05B 65/0864 70/369
4,914,932 A 4/1990 Walla
5,038,589 A 8/1991 Martin
5,101,649 A 4/1992 Duval
5,634,359 A * 6/1997 Huebschen ............. E05B 9/086 70/369
6,035,673 A * 3/2000 Harrison ................. E05B 9/084 70/369
6,209,369 B1 * 4/2001 Freck ...................... E05C 3/042 70/427
8,336,349 B2 12/2012 Thimmappa et al.
(Continued)

*Primary Examiner* — Christopher J Boswell
(74) *Attorney, Agent, or Firm* — Bamert Regan PLLC; John J. Bamert, Esq.; Raymond W. Armentrout, Esq.

(57) ABSTRACT

A cam lock for cabinets adaptable to cabinet drawers and doors of various thicknesses is disclosed. The cam lock includes a cam, a plug, an adapter, and a cylinder housing. The plug has a keyway and tumblers in communication with the keyway. The adapter is configured to couple to the cam and the plug. The cylinder housing is configured to receive the plug and the adapter. The retainer clip is configured to extend through the cylinder housing into registry with the plug after the plug and adapter are inserted into the cylinder to thereby retain both the plug and the adapter in the cylinder housing, whereby installation of the cam lock in the cabinet is simplified.

21 Claims, 23 Drawing Sheets

(56) References Cited

U.S. PATENT DOCUMENTS

| | | | | |
|---|---|---|---|---|
| 9,309,695 | B2 * | 4/2016 | Westwinkel | E05B 9/086 |
| 2003/0126897 | A1 * | 7/2003 | Shen | E05B 29/00<br>70/495 |

* cited by examiner

WAFER-TUMBLER CAM LOCKS FOR CABINETS

FIELD OF THE INVENTION

The invention relates generally to security devices for cabinet drawers and doors and, more particularly, to wafer-tumbler cam locks for cabinets.

BACKGROUND OF THE INVENTION

Cam locks for cabinet drawers and doors are available in a variety of lengths to accommodate cabinets that have drawers and doors of different thicknesses. An inventory of parts for different length locks requires a large investment and consumes significant space. A cam lock is one type of cabinet drawer or door lock that has a bolt (or "cam") that rotates about a rotation axis passing through one end of the cam (rather than oscillating as a piston). The cam is typically directly connected to a rotating plug disposed in a cylinder housing through the rotation axis, such as by a screw. The plugs define the key pattern required to actuate the lock, and rotation of the plug in the cylinder housing rotates the cam.

Pin-tumbler cam locks have multiple pins in the plugs to define the key pattern required to actuate the lock. Those pins prevent insertion or removal of the plug into or from the cylinder housing without the key placing the plug into an unlocked configuration. Accordingly, cabinet makers or locksmiths must insert the key in the plug to place the tumblers in an unlocked configuration while inserting the plug into the cylinder as part of the assembly process. Once the key is thereafter removed from the plug, the plug is retained in the cylinder housing by the pins and the cam, which after installation in a cabinet, is fastened to the rear end portion of the plug that extends out of the rear opening in the cylinder housing.

U.S. Pat. No. 4,914,932 issued to Walla describes a pin-tumbler cabinet lock having a removable plug that directly couples to a cam in the traditional manner. Walla also teaches a traditional oscillating bolt-action lock that employs a coupling to extend or retract a bolt responsive to rotation of a plug. The coupling is not able to engage the cam, and the plug has a different design in each embodiment to either engage the coupling or accept a fastener that clamps the cam. Each embodiment disadvantageously requires entirely different sets of parts for cabinets having drawers or doors of different thicknesses.

U.S. Pat. No. 8,336,349 issued to Thimmappa et al. teaches a pin-tumbler lock having an extension disposed between a plug and a cam. The locks cannot be assembled with both the plug and extension installed in the cylinder housing before shipping to cabinet makers or locksmiths because the installer would have to disassemble the lock prior to installation due to the fastening of the cam to the plug also retaining the extension in the housing. Assembly of the lock by the installer is also challenging because the installer must use both hands to use a key to place the pin-tumblers in the unlocked configuration while installing the plug in the cylinder housing, align and orient the extension with respect to the plug while simultaneously fastening the cam to the plug and thereby clamping the extension between the plug and the cam.

U.S. Pat. No. 5,038,589 issued to Martin (assigned to the assignee of the present application) teaches a pin-tumbler cam lock having a slidable lid on the top of the cylinder housing to secure the pin tumblers inside the cylinder housing while making the pin tumblers easy to replace when the lid is slidably removed. Consistent with typical pin-tumbler locks, the pin tumblers retain the plug in the housing. After the plug is retained by the pin tumblers in the housing, the lid can be slid into the closed configuration, and a clip is installed to prevent the lid from sliding to the open configuration. Removing the clip allows the lid to be slidably removed. Without a key transitioning the pin tumblers to the unlocked configuration, the plug remains retained in the housing after removal of the clip until both the lid is slidably removed and the pins are separated from the plug.

In contrast with pin-tumbler locks, typical wafer-tumbler cam locks have multiple raisable or depressible wafers in the plug to define the key pattern required to actuate the lock, and the plug may be freely inserted into or removed from the cylinder housing regardless of whether the plug is in a locked or unlocked configuration because the wafers in the locked configuration prevent rotation of the plug in the cylinder housing but not translation of the plug along the longitudinal axis of the cylinder housing. Typical wafer-tumbler plugs are secured in the cylinder housing by a fastener that secures the cam to the rear end portion of the plug. Accordingly, it is challenging for cabinet makers or locksmiths to install wafer-tumbler cam locks because they must insert and hold the plug in the cylinder housing extending through the cabinet drawer or door while fastening the cam to the rear of the plug in the cylinder housing while properly orienting all the components of the lock to work with the particular cabinet. Like pin-tumbler cam locks, wafer-tumbler cam locks are shipped to locksmiths and cabinet makers disassembled because, if assembled when shipped, the cabinet maker or locksmith would have to disassemble the lock prior to installation to remove the cam, which when assembled prevents the lock from fitting through the hole for the cylinder housing in the cabinet drawer or door. Wafer-tumbler cam locks, however, are shipped with even more separate pieces and with the plug being separate from the cylinder housing because there is no way to retain the typical wafer-tumbler plug in the cylinder housing prior to fastening the cam to the rear of the plug.

Some wafer-tumbler locks, such as those available under the marks CYBER-LOCKS or TIMBERLINE, have an extra tumbler in the plug that does not influence whether the plug is in the locked or unlocked configuration. The extra tumbler instead protrudes farther outward from the plug than the main wafer tumblers and prevents insertion or removal of the plug into or from the cylinder housing until a special change tool (i.e., a control key) is inserted into the keyway to retract the extra wafer tumbler. These special wafer-tumbler locks have a number of disadvantages. First, the parts for these special wafer-tumbler locks are more difficult or expensive to manufacture and may decrease reliability and serviceability in the field. Second, the need for the special change tool increases costs for locksmiths and cabinet makers and increases the number of tools that the locksmith or cabinet maker must carry. The plugs of these locks cannot be installed in the cylinder housing without knowing the handing or orientation of the cabinet drawer or door in which the lock will be mounted because the plugs are installed in different orientations that are rotated 180° about the longitudinal axis of the cylinder housing depending on whether the cam arms should throw up and/or left or instead down and/or right to provide the customary key orientation.

U.S. Pat. No. 5,101,649 issued to Duval teaches a wafer-tumbler lock having an extension disposed between a plug and a cam. The lock suffers from similar problems as the locks available under the marks CYBER-LOCKS or TIMBERLINE because it has an extra wafer that requires a special change tool or master key to insert or remove the plug into or from the cylinder housing. Assembly of the lock is also challenging because the installer must insert the extension into the cylinder housing and, while holding the special change tool or master key in the plug to position the wafer tumblers in the unlocked configuration, blindly align the plug with the extension and subsequently rotate both the plug and the extension into the locked configuration before removing the special change tool or master key.

Therefore, there is a need for wafer-tumbler cam locks that may be affordably manufactured and easily installed without specialized tools.

SUMMARY OF THE INVENTION

It is an object of the present invention to provide cam locks that may be easily installed without specialized tools or master keys.

It is also an object of the present invention to provide cam locks that may be stored with fewer versions of each part in inventory than the number of combinations of keys and lock lengths.

It is another object of the present invention to provide cam locks that may be affordably manufactured.

The invention achieves the above objects, as well as other objects and advantages that will become apparent from the description that follows, by providing a method for packaging cabinet cam locks for shipping to a cabinet maker or locksmith, providing a method of installing the cam locks in cabinets, and providing the cam locks for cabinet drawers or doors. The method for packaging includes providing an inventory of cam lock parts, therein the inventory includes cams, plugs, adapters, and cylinder housings with the adapters and cylinder housings sized such that a variety of key and lock length combinations are provided while the plugs are uniformly sized. The plugs each have a keyway and tumblers in communication with the keyway. In some embodiments, the plugs can be removed from the cylinder housing without inserting a key or other tool into the keyway. In some embodiments, the tumblers are non-pin tumblers, such as wafer tumblers. The adapters are configured to couple to each of the cams and each of the plugs. As stated above, each adapter has a different length than each other adapter (for example, a warehouse may have multiple sets of these inventories). The cylinder housings are configured to receive each plug, and each of the cylinder housings has a different length than each other cylinder housing. Each cylinder housing that is longer than the plugs is configured to receive one of the various adapters. A part count in the inventory is thereby reduced.

A first thickness (for example, a first range of thicknesses) of a first cabinet drawer or door in which a first cam lock is intended to be installed is determined. In some embodiments, without regard for the determined first thickness, a cam and a plug are selected. Based on the determined first thickness, a first adapter and a first cylinder housing are selected. The first adapter and the first plug are inserted into the first cylinder housing. In some embodiments, the first adapter and the first plug are inserted into the first cylinder housing without inserting a key or other tool into the keyway of the first plug. The first plug is secured in the first cylinder housing to retain both the first adapter and the first plug in the first cylinder housing, without securing the cam or another component (for example, a washer) to the first plug, the first adapter, or a rear of the first cylinder housing. In some embodiments, securing the first plug in the first cylinder housing includes inserting a retainer clip through the first cylinder housing into registry with the first plug in the first cylinder housing. In some embodiments, the retainer clip inserted through the first cylinder housing in a direction that is transverse to the longitudinal axis of the cylinder housing. In some embodiments, securing the first plug in the first cylinder housing secures the first adapter in the first cylinder housing by retaining the first adapter between the first plug and a rear, inwardly extending flange in the first cylinder housing. In some embodiments, the retainer clip is configured to retain itself in the first cylinder housing against a force of gravity regardless of orientation of the first cylinder housing, whereby installation of the first packaged cam lock in the first cabinet drawer or door is simplified.

In some embodiments, the first plug is devoid of any tumblers that engage the first cylinder housing to secure the first plug in the first cylinder housing. The first cam, the first plug, the first adapter, and the first cylinder housing are packaged into a first packaging (for example, manufacturer's or seller's packaging) while the first plug and the first adapter are disposed in the first cylinder housing to provide a first packaged cam lock without the cam or another component (for example, a washer) being coupled to the first plug, the first adapter, or the rear of the first cylinder housing, whereby installation of the first packaged cam lock in the first cabinet drawer or door is simplified, regardless of the orientation of the first cylinder housing or the first plug relative to the first cabinet drawer or door and regardless of the throw direction for the cam after installation.

The method for installing cam locks in cabinets includes providing the packaged cam locks in the packaging and unpacking the cam locks from the packaging. In some embodiments, considering one of the cam locks, the cylinder housing is inserted through a hole defined by the cabinet without inserting a key or other tool into the keyway and while the plug and the adapter are retained in the cylinder housing. The cam is coupled to the adapter or the plug while the cylinder housing extends through the hole. In some embodiments, a spur washer is placed over the rear end portion of the cylinder housing followed by a fixing nut, thereby clamping the cabinet against a front, outwardly extending flange of the cylinder housing, before coupling the cam to the adapter or the plug.

In some embodiments, a cam lock for cabinets includes a cam, a plug, an adapter, a cylinder housing, and a retainer clip. The plug has a keyway and tumblers in communication with the keyway. In some embodiments, the plugs can be removed from the cylinder housing without inserting a key or other tool into the keyway. In some embodiments, the tumblers are non-pin tumblers, such as wafer tumblers. The adapter is configured to couple to the cam and the plug. The cylinder housing is configured to receive the plug and the adapter. The retainer clip is configured to extend through the cylinder housing into registry with the plug after the plug and adapter are inserted into the cylinder to thereby retain both the plug and the adapter in the cylinder housing, whereby installation of the cam lock in the cabinet is simplified.

In some embodiments, the method of packaging includes determining a second thickness (for example, a range of thicknesses) of a second cabinet drawer or door in which a second cam lock is intended to be installed. The second thickness is greater than the first thickness. In some embodiments, without regard for the second determined thickness, a second cam and a second plug are selected. Based on the second determined thickness, a second adapter and a second cylinder housing are selected, each of which is respectively longer than the first adapter and the first cylinder housing.

The second adapter and the second plug are inserted into the second cylinder housing. In some embodiments, the second adapter and second plug are inserted into the second cylinder housing without inserting a key or other tool into the keyway of the second plug. The second plug is secured in the second cylinder housing to retain both the second adapter and the second plug in the second cylinder housing. In some embodiments, the second plug is devoid of any tumblers that engage the second cylinder housing to secure the second plug in the second cylinder housing. The second cam, the second plug, the second adapter, and the second cylinder housing are packaged into a second packaging (for example, manufacturer's or seller's packaging) while the second plug and the second adapter are disposed in the second cylinder housing to provide a second packaged cam lock, whereby installation of the second packaged cam lock in the second cabinet drawer or door is simplified.

In some embodiments, securing the second plug in the first cylinder housing includes inserting a retainer clip through the second cylinder housing into registry with the second plug in the second cylinder housing. The retainer clip is configured to retain itself in the second cylinder housing against a force of gravity regardless of orientation of the second cylinder housing, whereby installation of the second packaged cam lock in the second cabinet drawer or door is simplified.

In some embodiments, each plug has an outer surface that defines a plug-housing interface, and each cylinder housing has an inner surface that defines a housing-plug interface. Each plug-housing interface and each housing-plug interface cooperatively prevent each plug from being fully received in or rotating in each cylinder housing unless inserted in a predefined orientation relative to each cylinder housing, whereby assembly of the first cam lock is simplified.

In some embodiments, each front end portion of each cylinder housing is configured to prevent each plug from sliding entirely through each cylinder housing, and each rear end portion of each cylinder housing that is longer than the plugs is configured to prevent the adapters from being inserted entirely through the rear end portion, whereby installation of the first packaged cam lock in the first cabinet drawer or door is simplified.

In some embodiments, each plug has a plug-cam interface, and each adapter has a plug-adapter interface and an adapter-cam interface. Each plug-adapter interface is configured to couple to each plug-cam interface. Each adapter-cam interface is configured to couple to each cam and has a same cross-sectional shape and dimensions as each plug-cam interface, whereby the part count in the inventory is reduced.

In some embodiments, after inserting the cylinder housing through the hole and before coupling the cam to the adapter or the plug, a spur washer is placed over a rear end portion of the cylinder housing. The washer defines a hole that is configured to receive the cylinder housing. The cylinder housing has an outer surface that defines a flat region along a length of the cylinder housing. The hole of the washer has a flat side that is configured to interface with the flat region. The washer has a spur that is configured to be driven into the cabinet when the washer is placed over the rear end portion of the cylinder housing, whereby the cylinder housing is prevented from rotating in the cabinet after installation of the cam lock in the cabinet. In some embodiments, the washer defines a fastener hole that is configured to receive a fastener that extends through the washer into the cabinet, whereby the ability of the washer to prevent rotation of the cylinder housing is strengthened. In some embodiments, the fastener hole is configured to position the fastener so as to prevent rotation of a nut threadably engaged with a rear end portion of the cylinder housing to prevent the nut from rotating on the cylinder housing.

BRIEF DESCRIPTION OF THE DRAWINGS

Preferred and alternative examples of the present invention are described in detail below with reference to the following drawings.

DETAILED DESCRIPTION OF THE PREFERRED EMBODIMENTS OF THE INVENTION

A wafer-tumbler cam lock in accordance with the principles of the invention is generally indicated at reference number 10 in the various Figures of the attached drawings, wherein numbered elements in the Figures correspond to like numbered elements herein.

Figure 2:
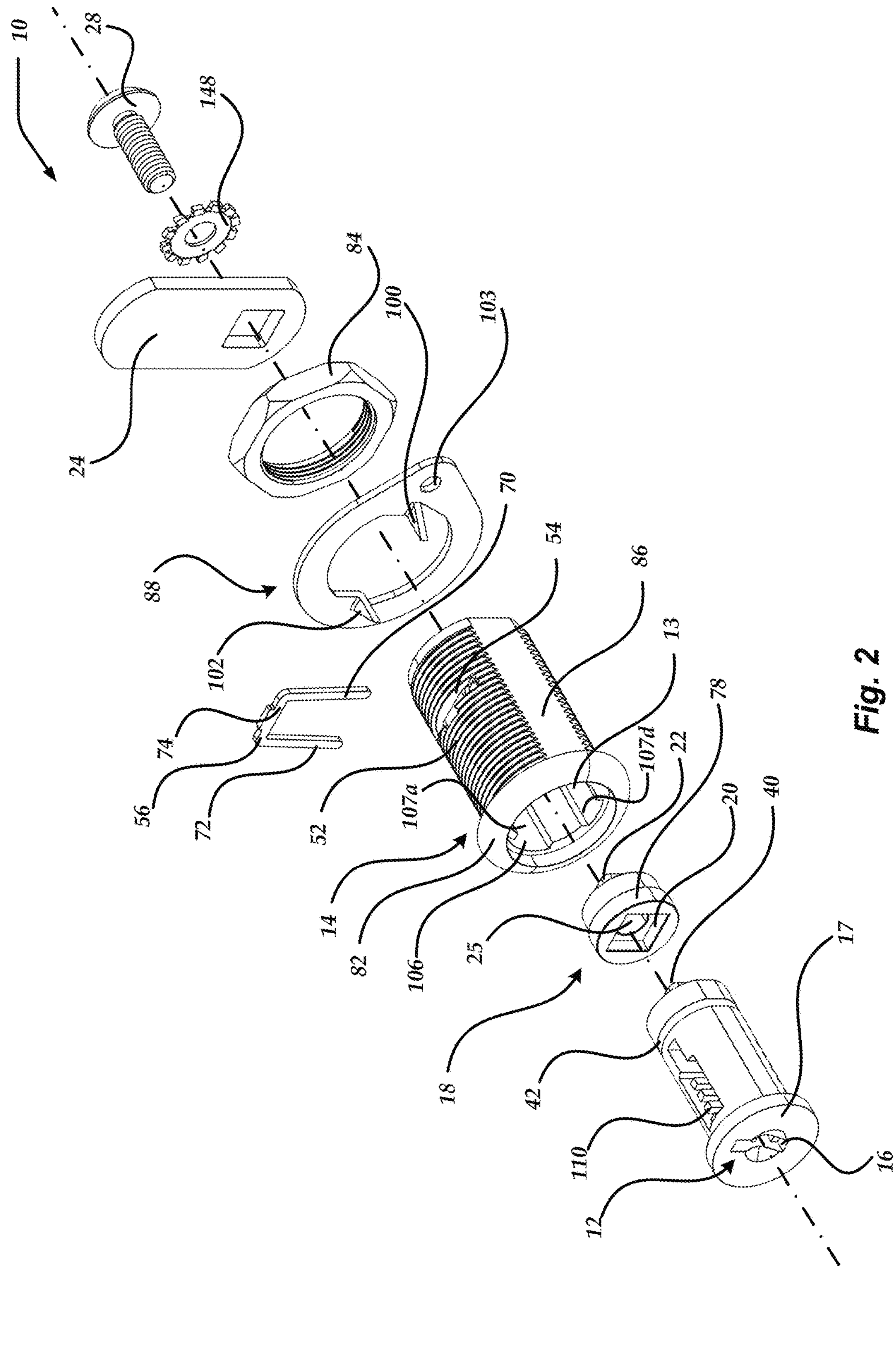
FIG. 2 is an exploded isometric view of the lock of FIG. 1.
Figure 3:
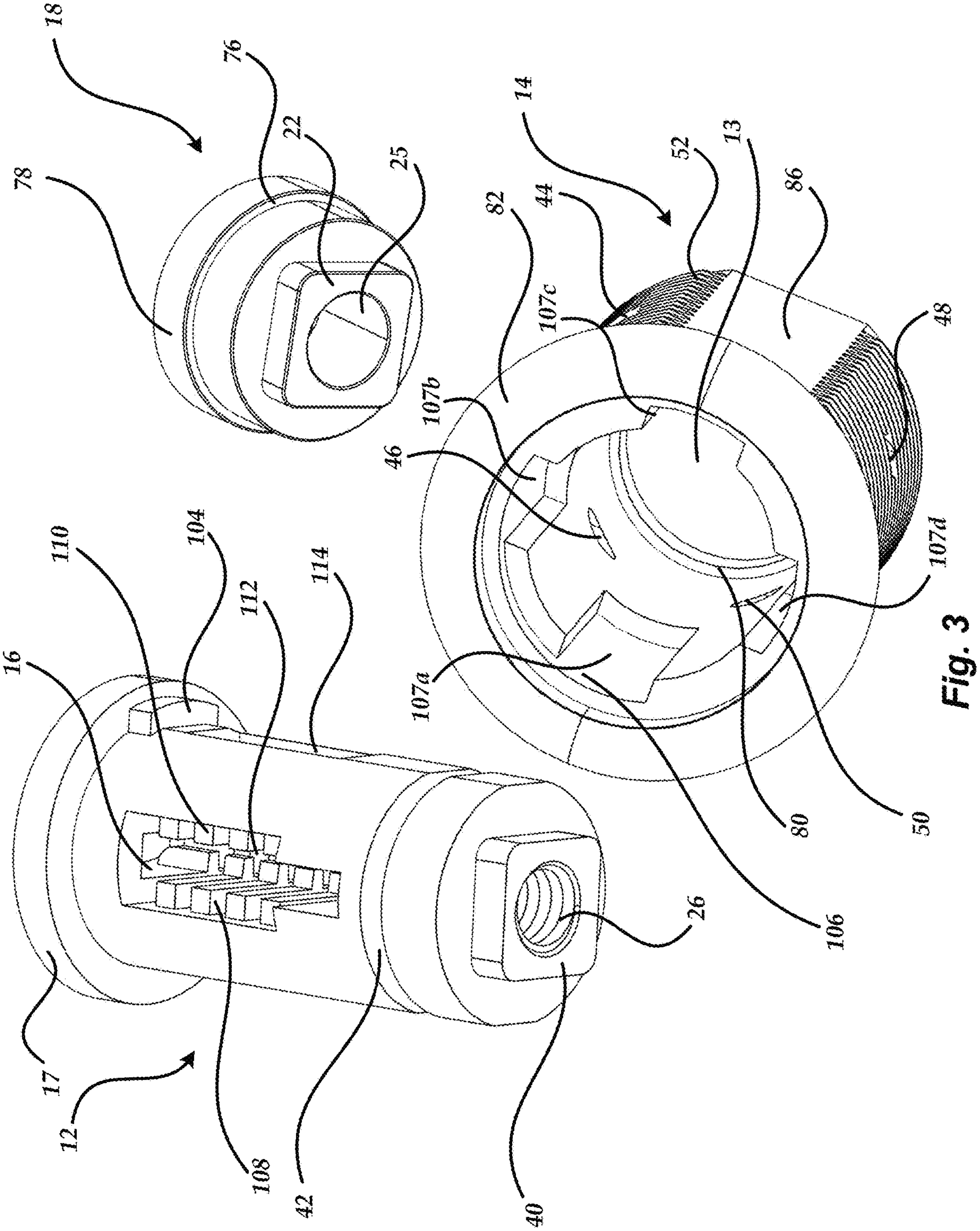
FIG. 3 is a front isometric view of several components of the lock of FIG. 1.
Figure 4:
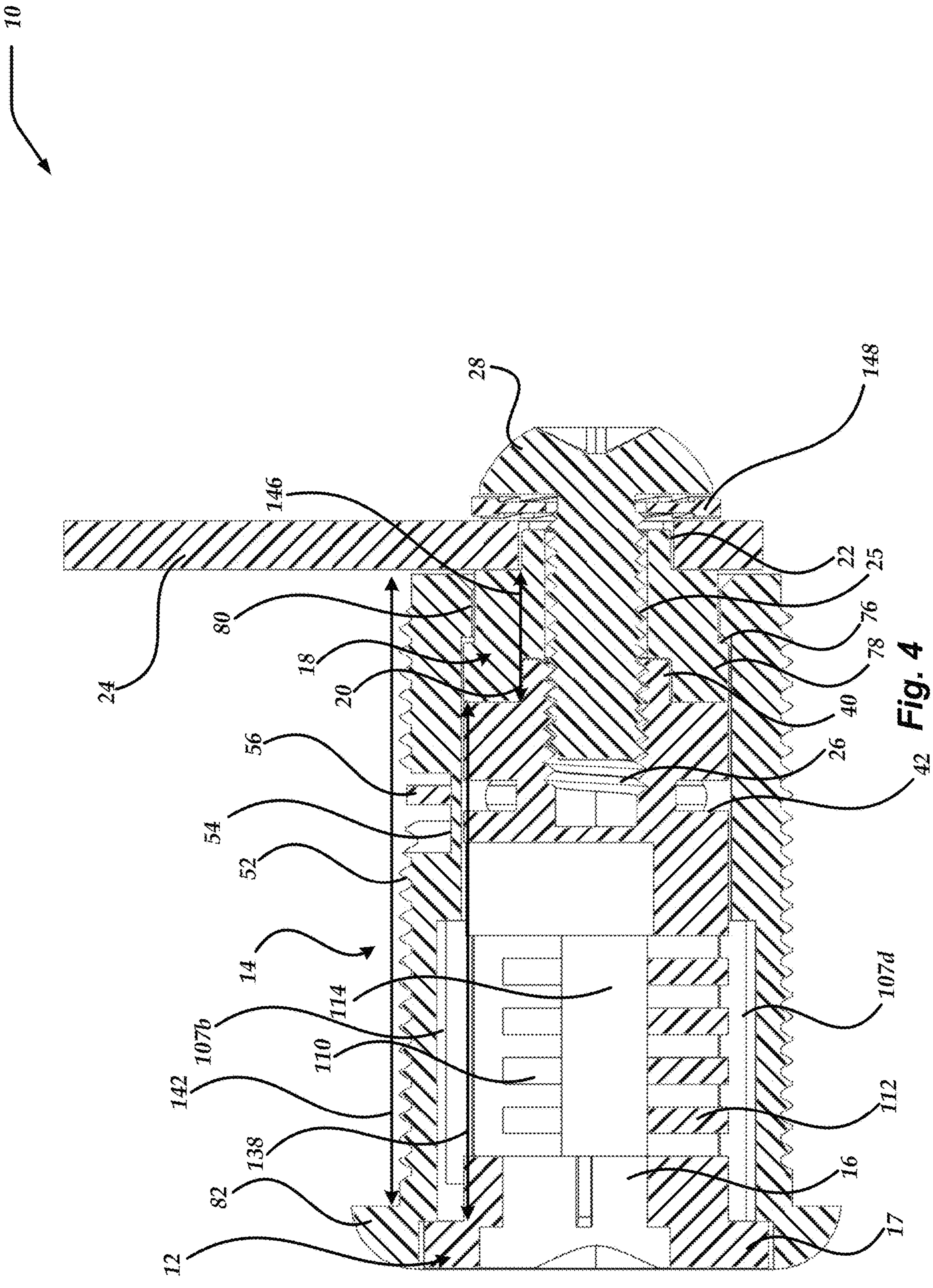
FIG. 4 is right elevational, sectional view of the lock shown in FIG. 1, taken along line 4-4 in FIG. 1.
Figure 5:
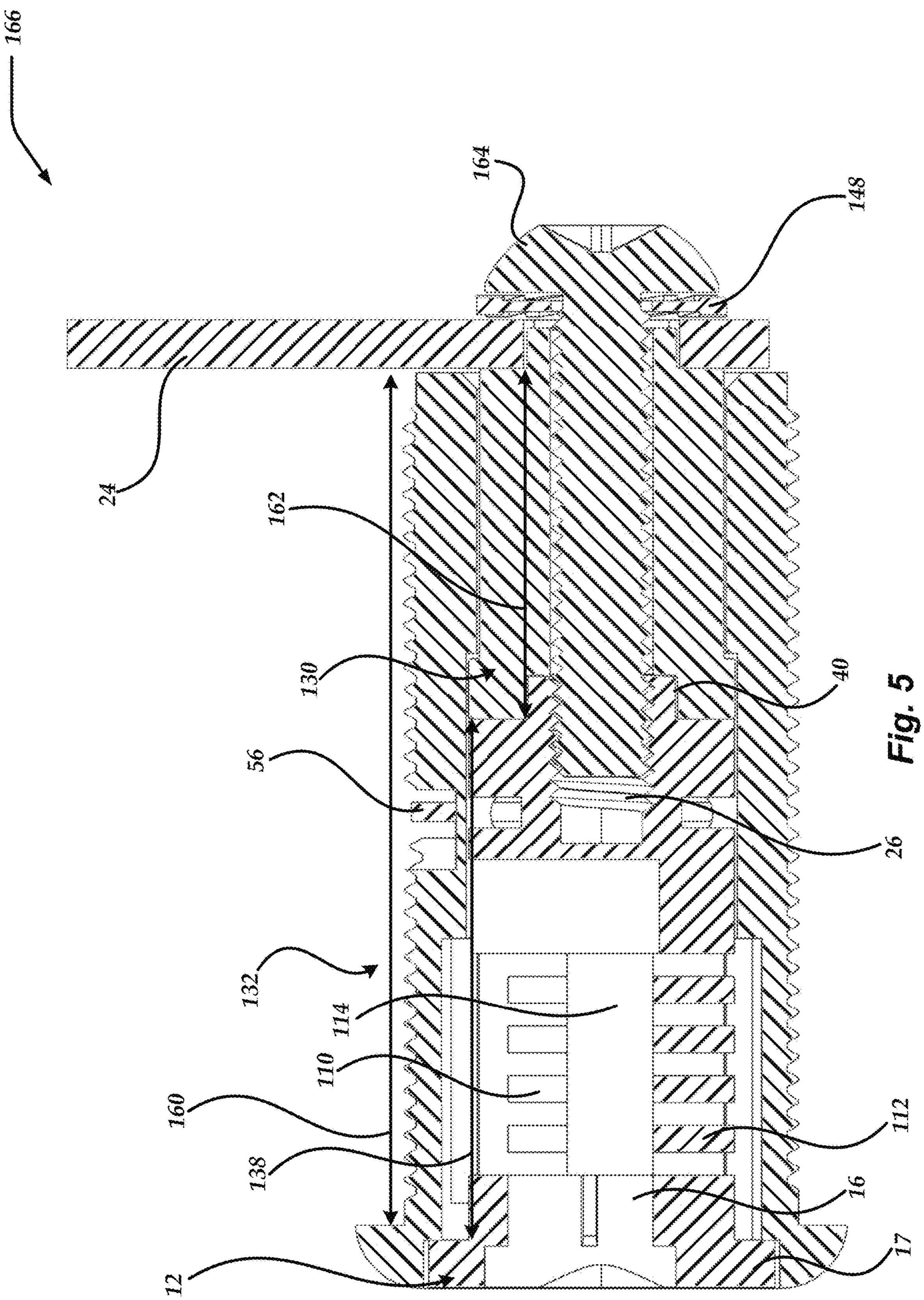
FIG. 5 is a right elevational, sectional view of another embodiment of a lock employing the concept of the present invention.

As shown in FIG. 2, the lock 10 includes a plug 12 that is configured to be axially and rotatably received in a longitudinal hole 13 defined by an elongated cylindrical housing 14. The plug 12 defines a keyway 16 that penetrates the plug 12 longitudinally from a front end portion 17 of the plug 12 for receiving a key (not shown). The plug 12 has a plurality of tumblers (not shown), such as wafer tumblers, located along the keyway 16. An adapter 18 is configured to be axially and rotatably received in the housing 14 rearward of the plug 12. The adapter 18 defines a plug-adapter interface 20 and an adapter-cam interface 22. The plug-adapter interface 20 is configured to couple to the plug 12, and the adapter-cam interface 22 is configured to couple to a cam 24. The adapter 18 defines a hole 25 that extends parallel to or within 5, 10, 15, or 20 degrees of parallel to the longitudinal axis of the plug 12 when installed in the housing 14. As shown in FIGS. 3 and 4, the plug 12 defines a threaded hole 26 that is concentric with the longitudinal axis of the plug 12 and configured to receive a fastener 28, such as a bolt, that extends through the cam 24 and the adapter 18 to clamp the adapter 18 and the cam 24 so that the adapter 18 and the cam 24 rotate with the plug 12. Accordingly, an inventory of cam lock parts includes plugs of the same length with different tumbler combinations to provide differently keyed plugs, adapters of different lengths, and housings of different lengths to facilitate providing a large variety of cam lock length and key combinations while having only a single plug length, thereby facilitating reducing a part count in the inventory (see FIGS. 4 and 5).

The rear end portion of the plug 12 defines a plug-cam interface 40, as shown in FIG. 3. The plug-cam interface 40 has the same cross-sectional shape and dimensions as the adapter-cam interface 22 of the adapter 18 as measured in a plane that is perpendicular to the longitudinal axis of the plug 12 when installed in the housing 14. The plug-adapter interface 20 of the adapter 18 is configured to couple to the plug-cam interface 40 of the plug 12. Accordingly, the inventory may include housings 14 that are too short to house both the plug 12 and an adapter while facilitating the plug-cam interface 40 of the plug 12 to directly couple to the cam 24 (see FIG. 6), thereby facilitating further reducing the part count in the inventory.

Figure 7:
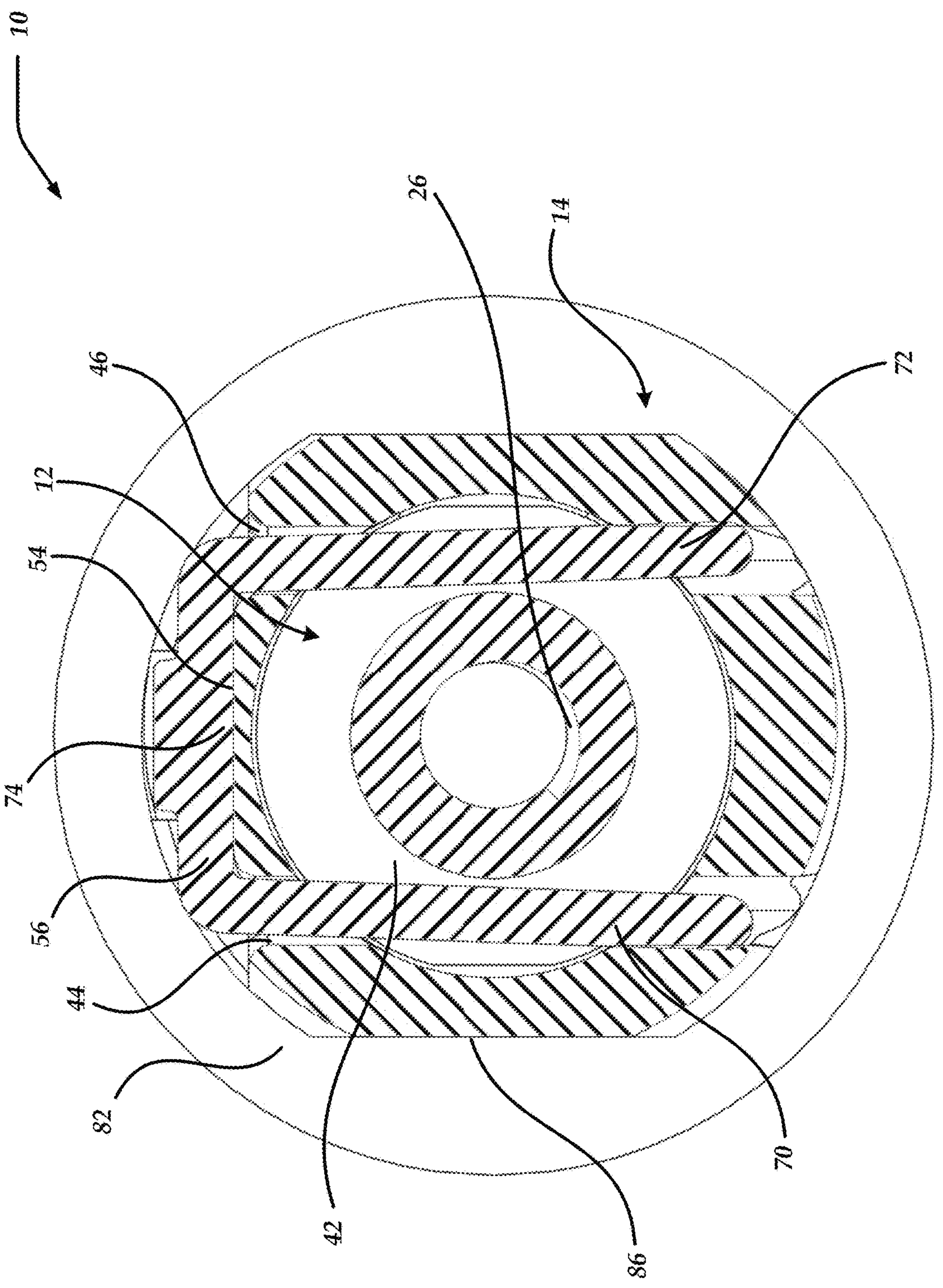
FIG. 7 is a front elevational, sectional view of the lock of FIG. 1, taken along line 7-7 in FIG. 1.
Figure 8:
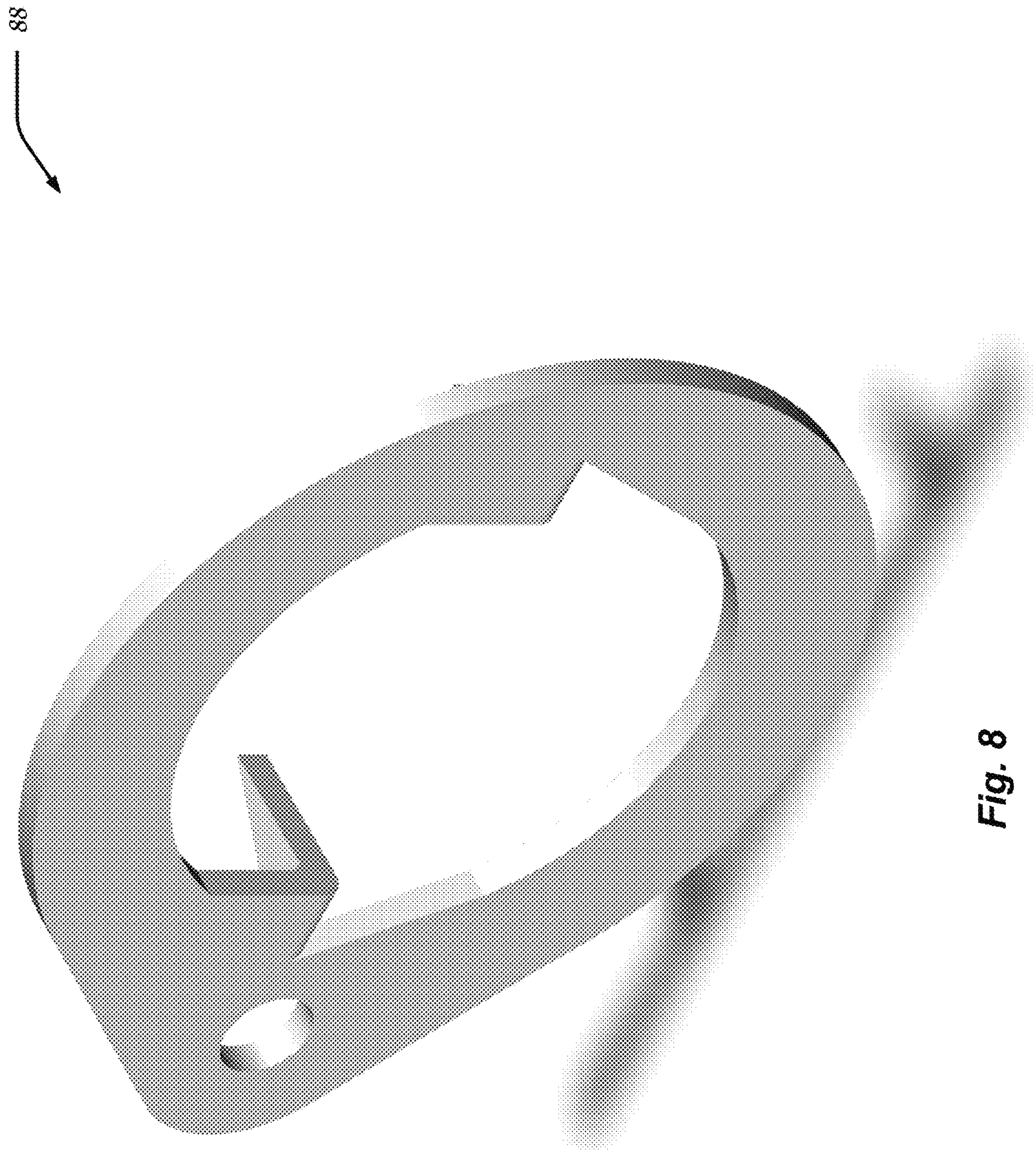
FIGS. 8-10 are isometric perspective views of the washer shown in FIG. 1.
Figure 9:
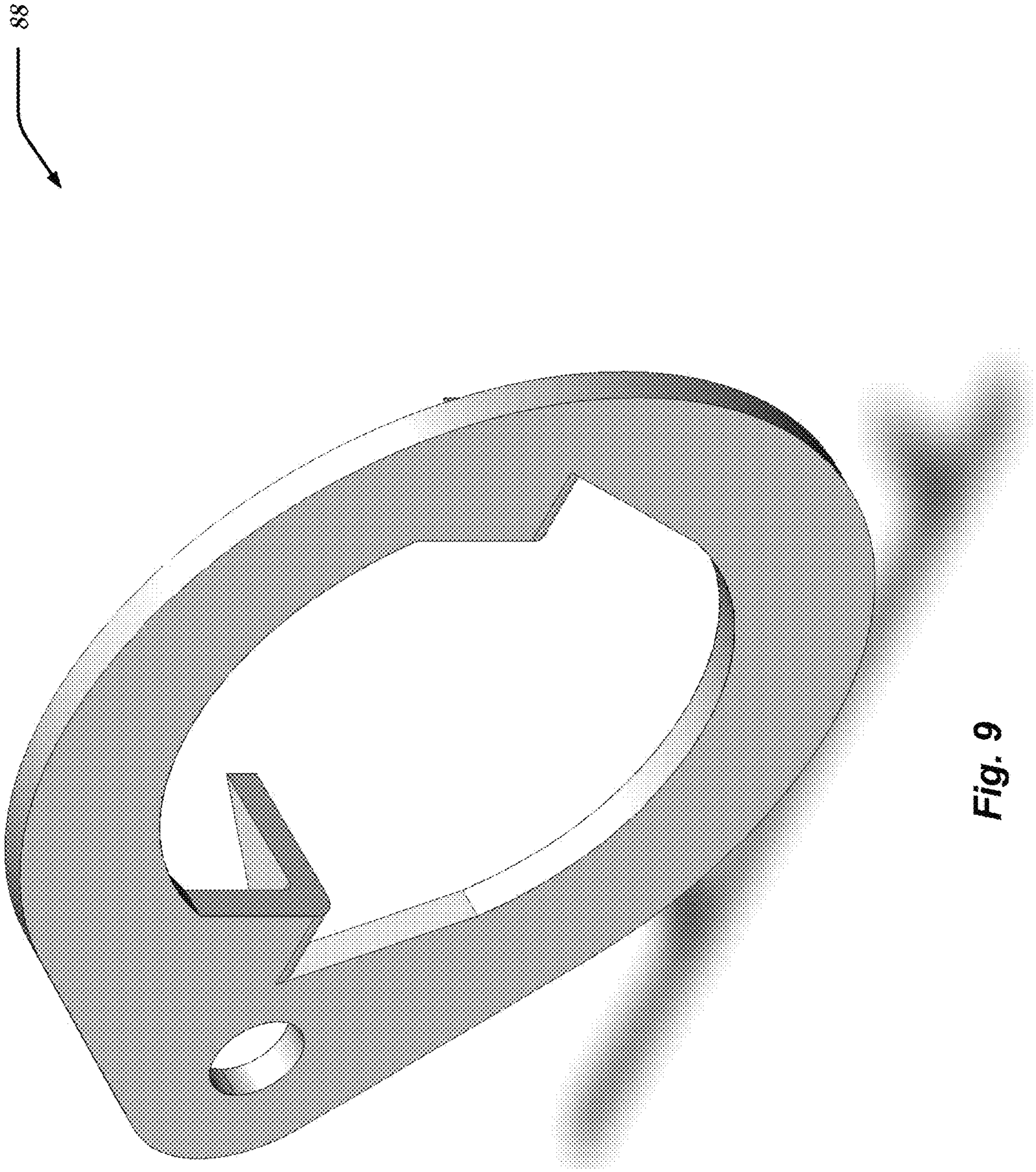
Figure 10:
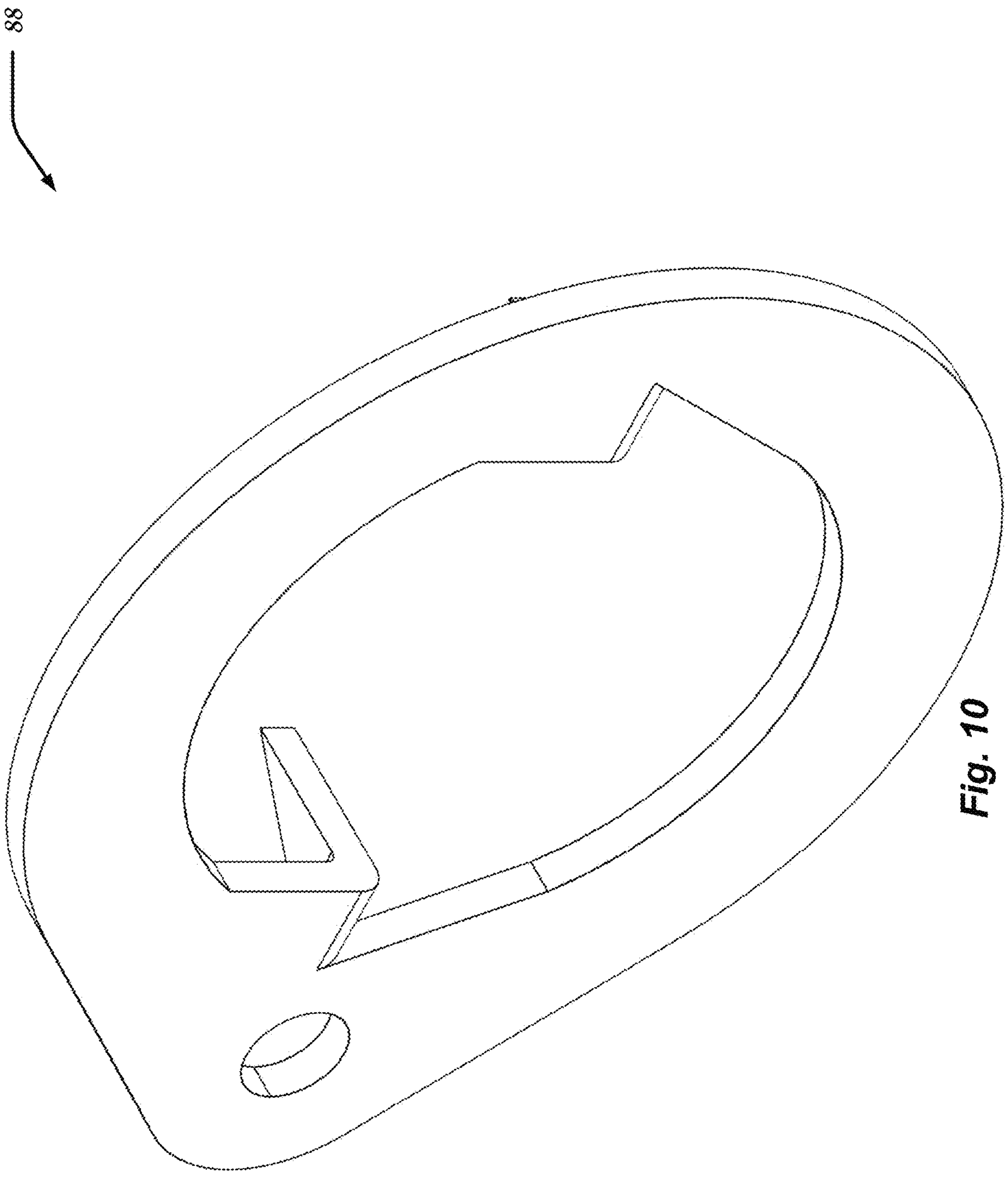
Figure 11:
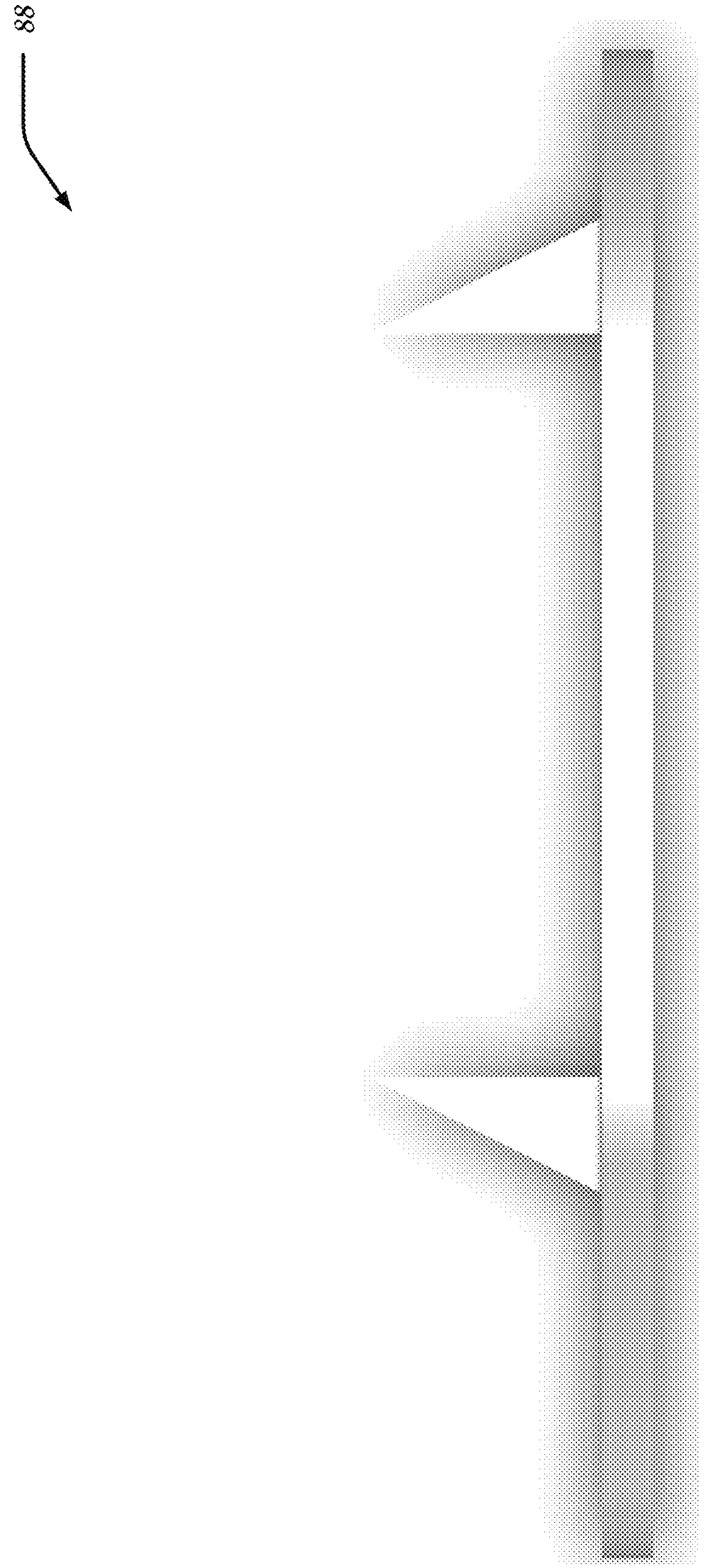
FIGS. 11-13 are isometric top views of the washer.
Figure 12:
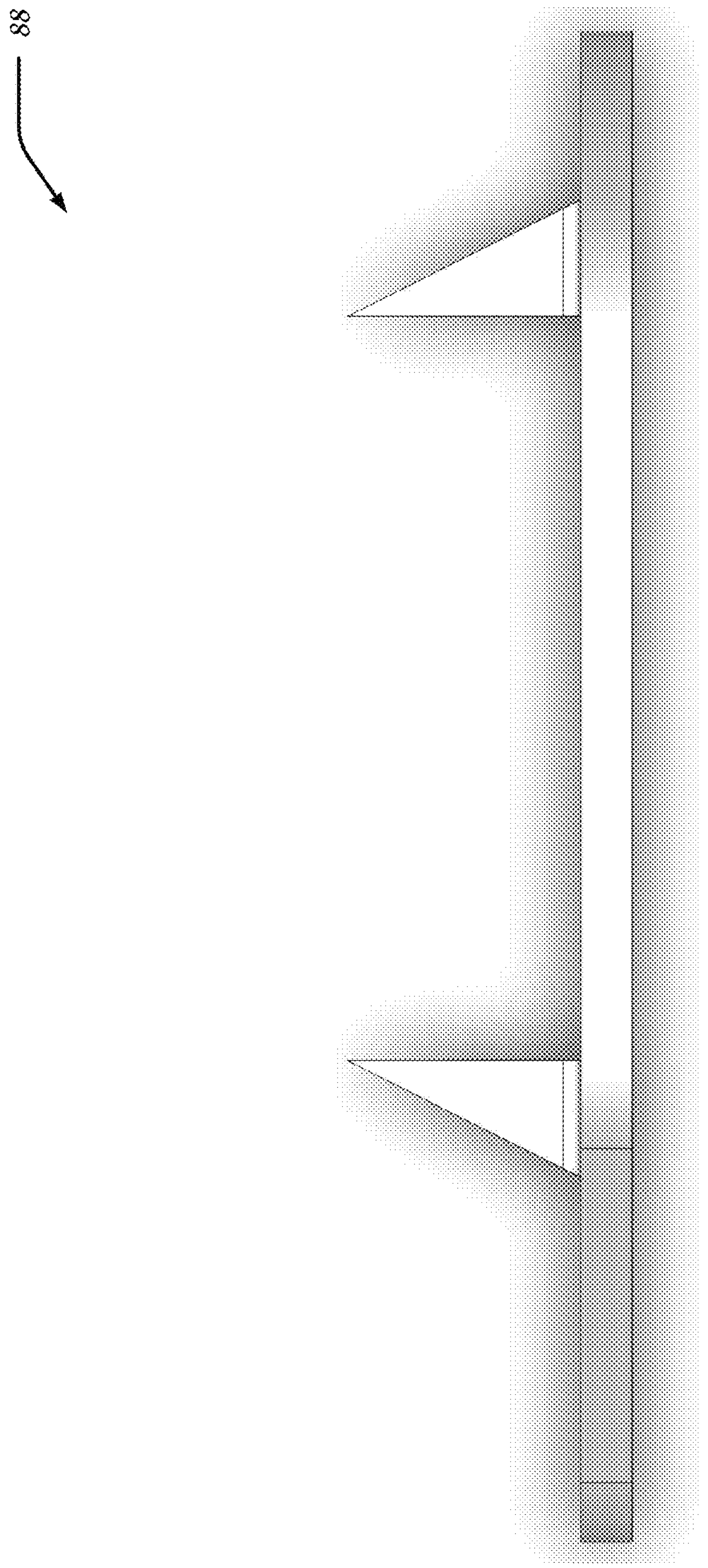
Figure 13:
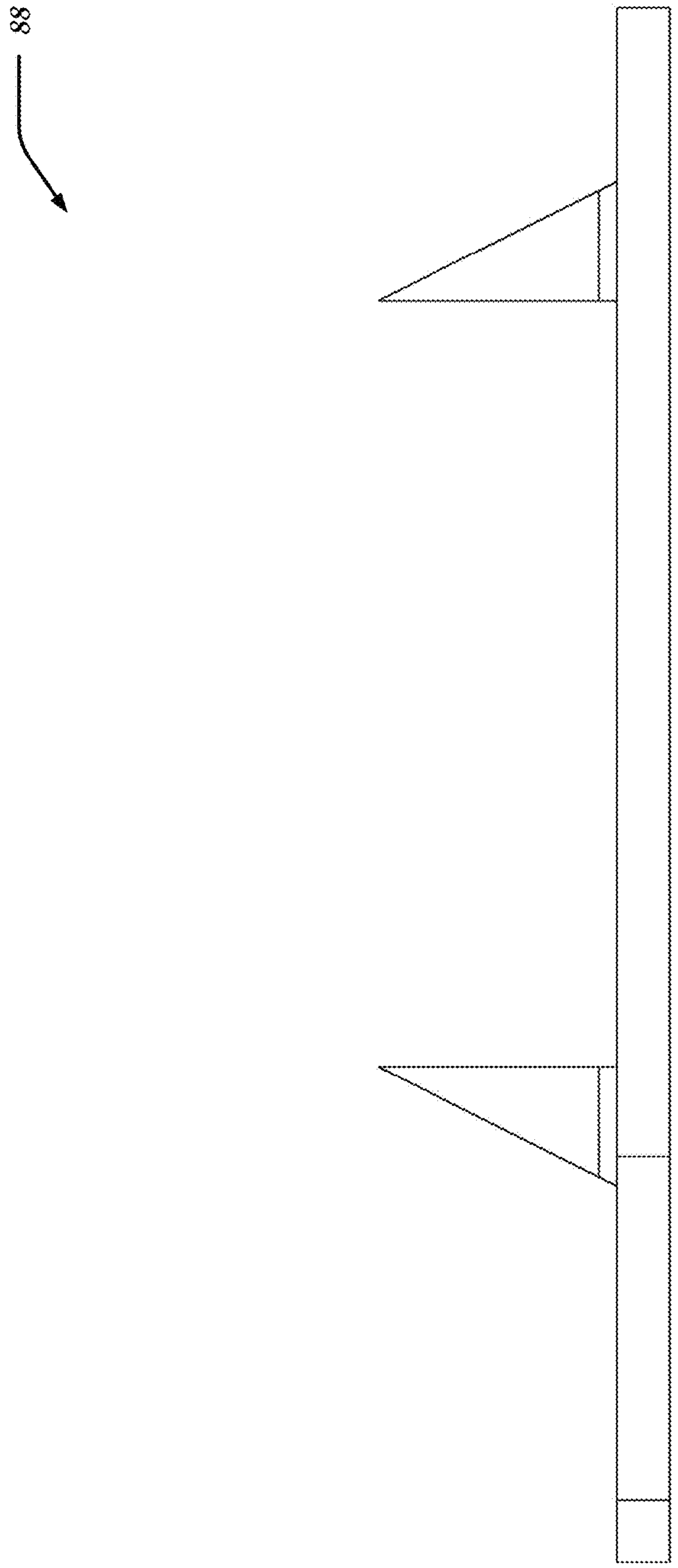
Figure 14:
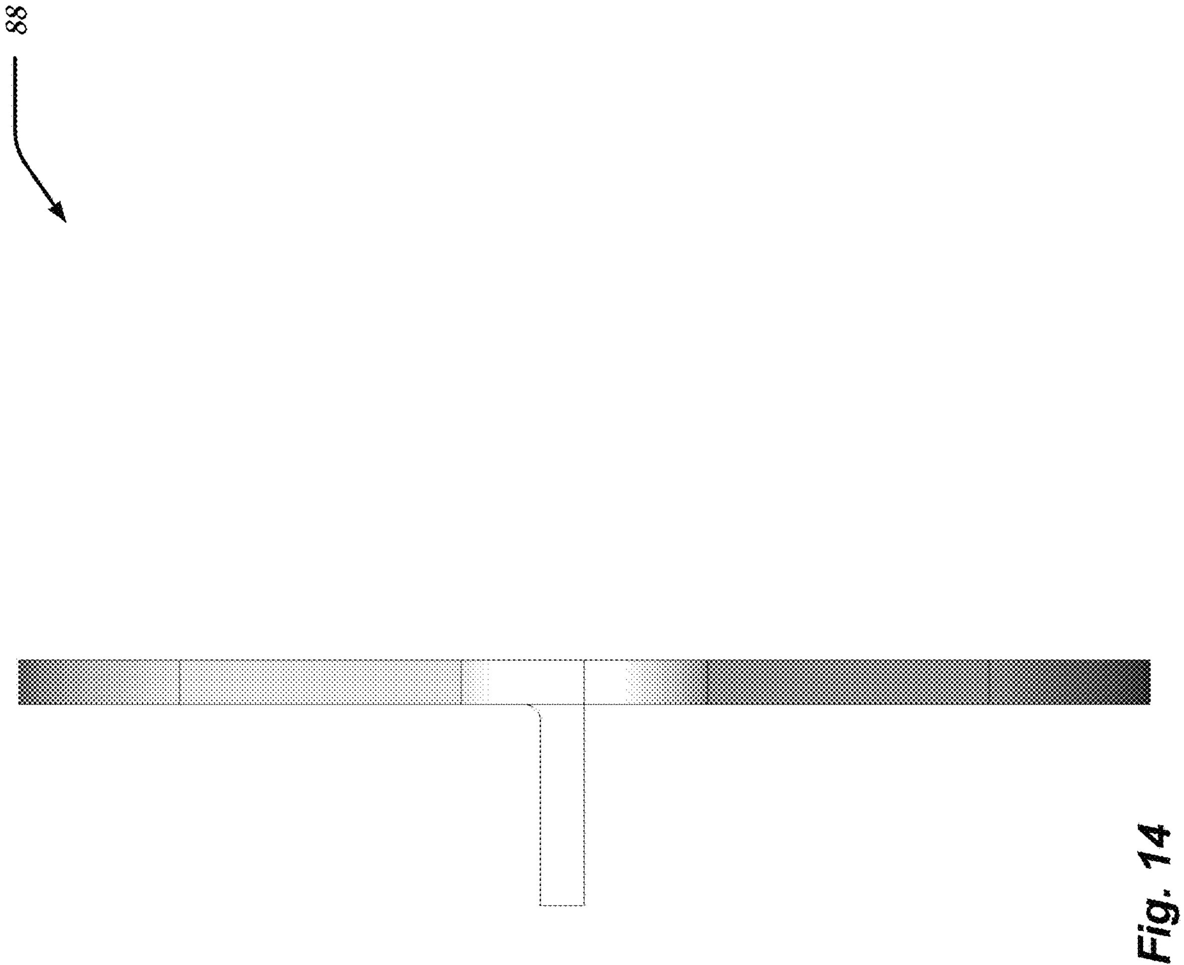
FIGS. 14 and 15 are isometric left elevational views of the washer.
Figure 15:
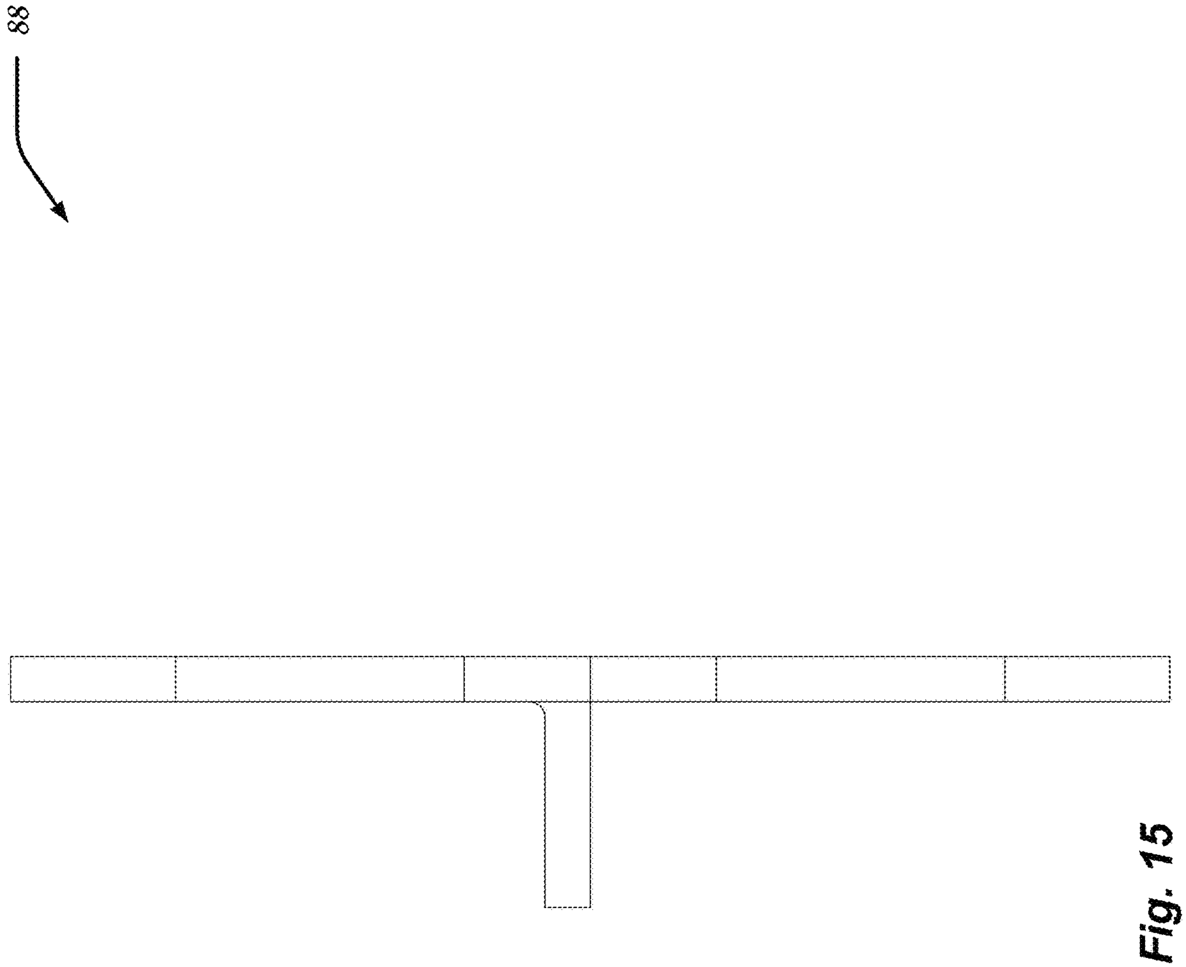
Figure 16:
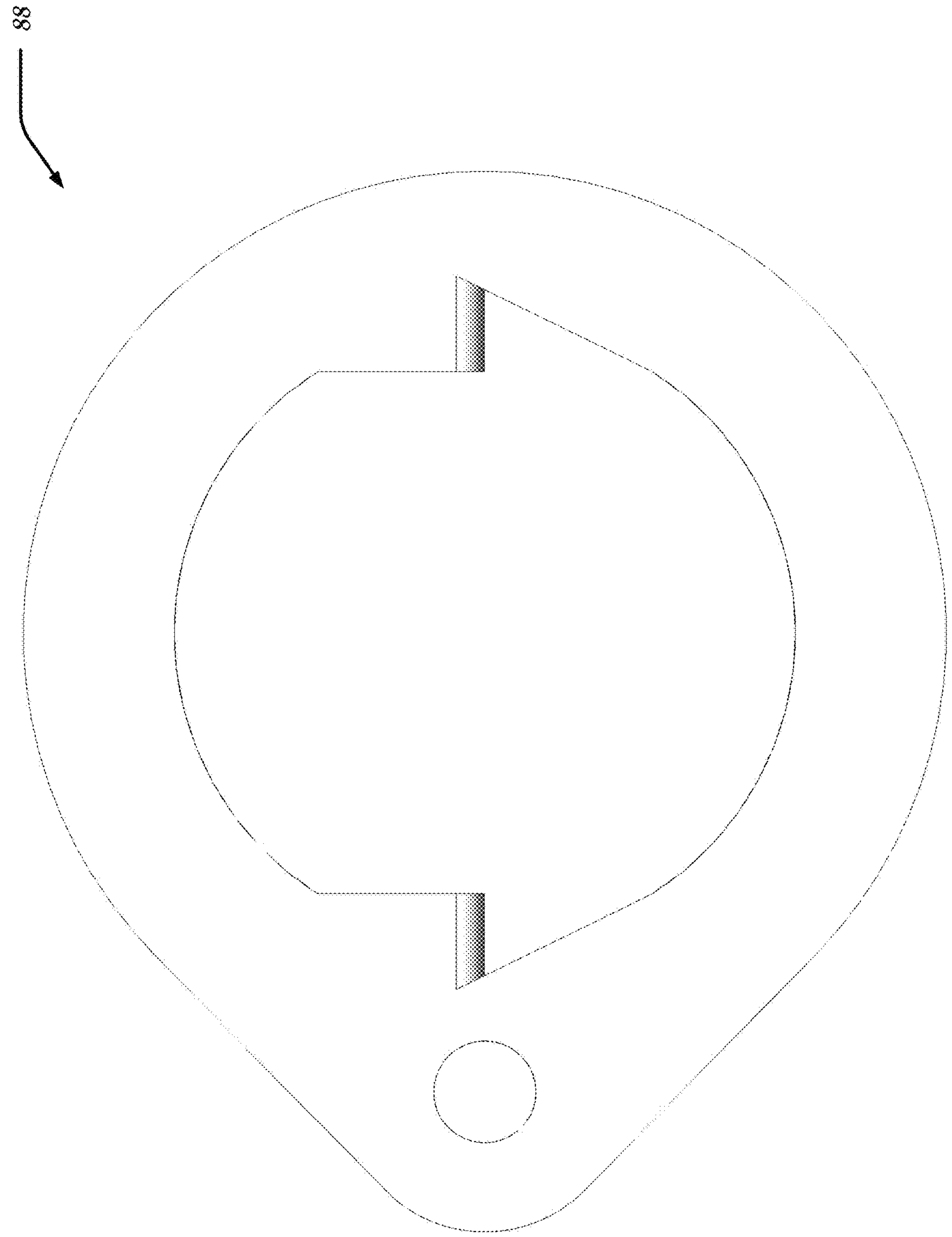
FIGS. 16 and 17 are isometric front elevational views of the washer.
Figure 17:
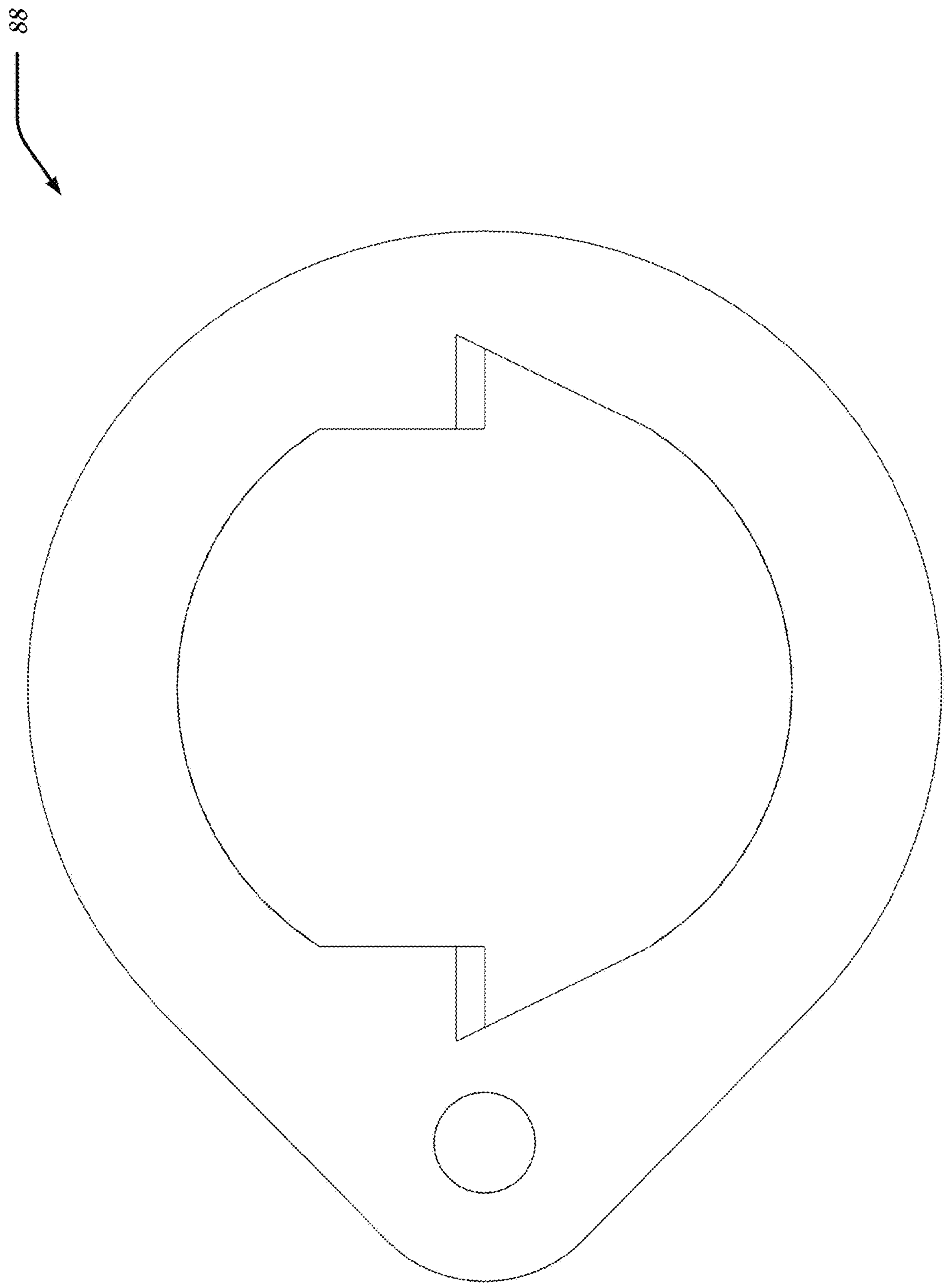
Figure 18:
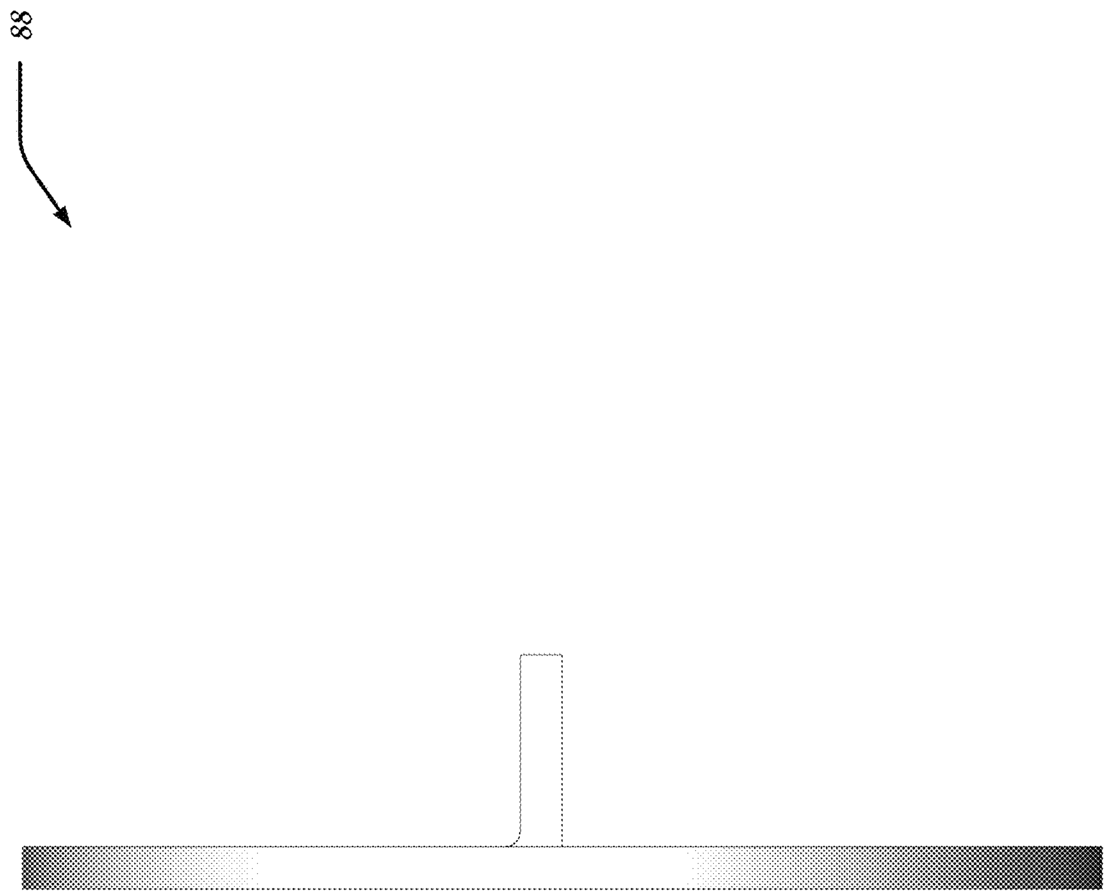
FIGS. 18 and 19 are isometric right elevational views of the washer.
Figure 19:
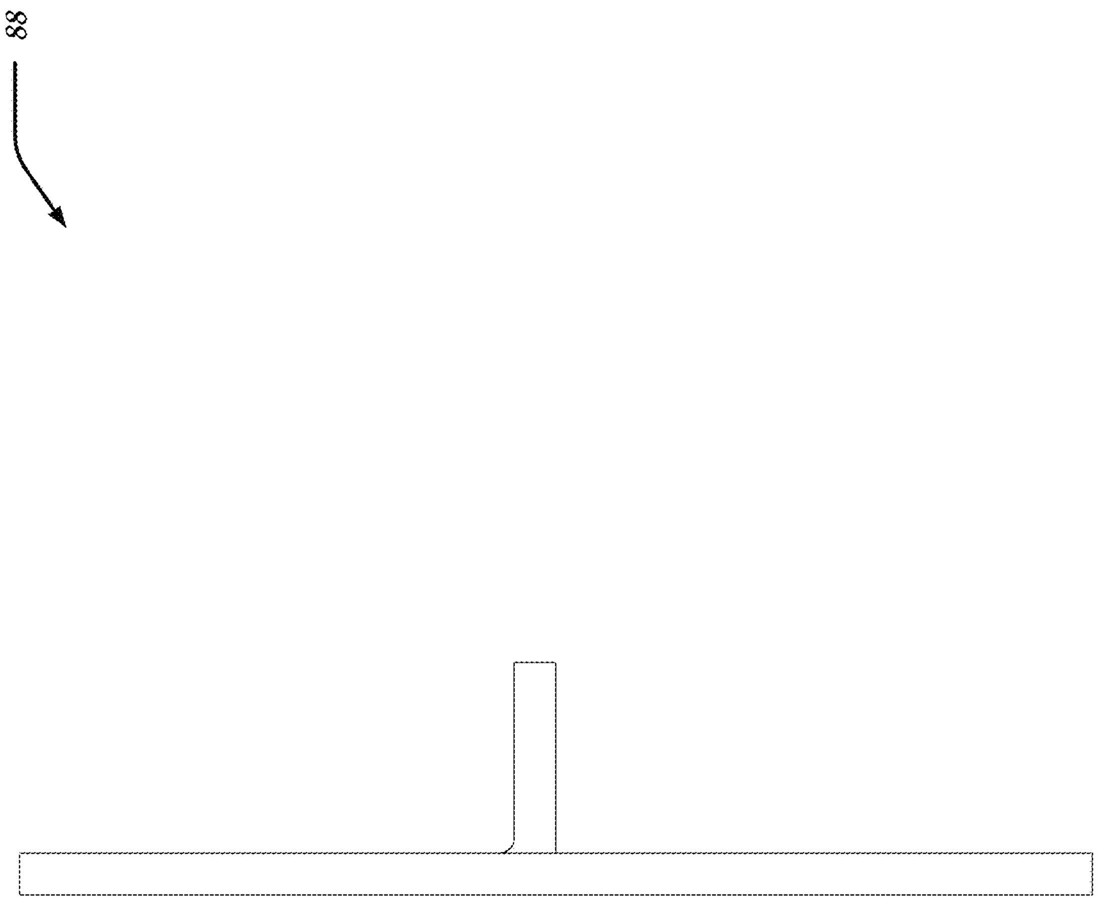
Figure 20:
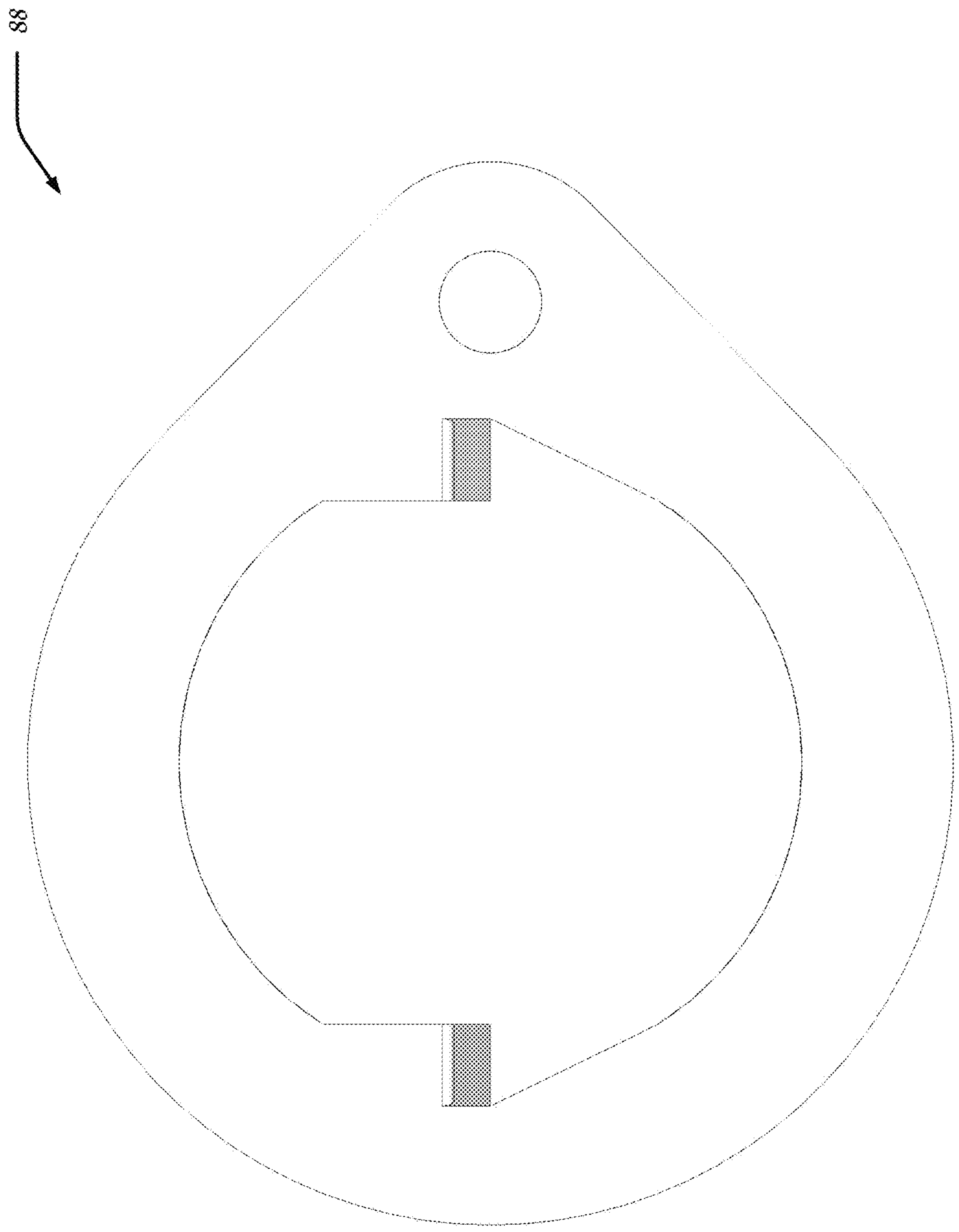
FIGS. 20 and 21 are isometric rear elevational views of the washer.
Figure 21:
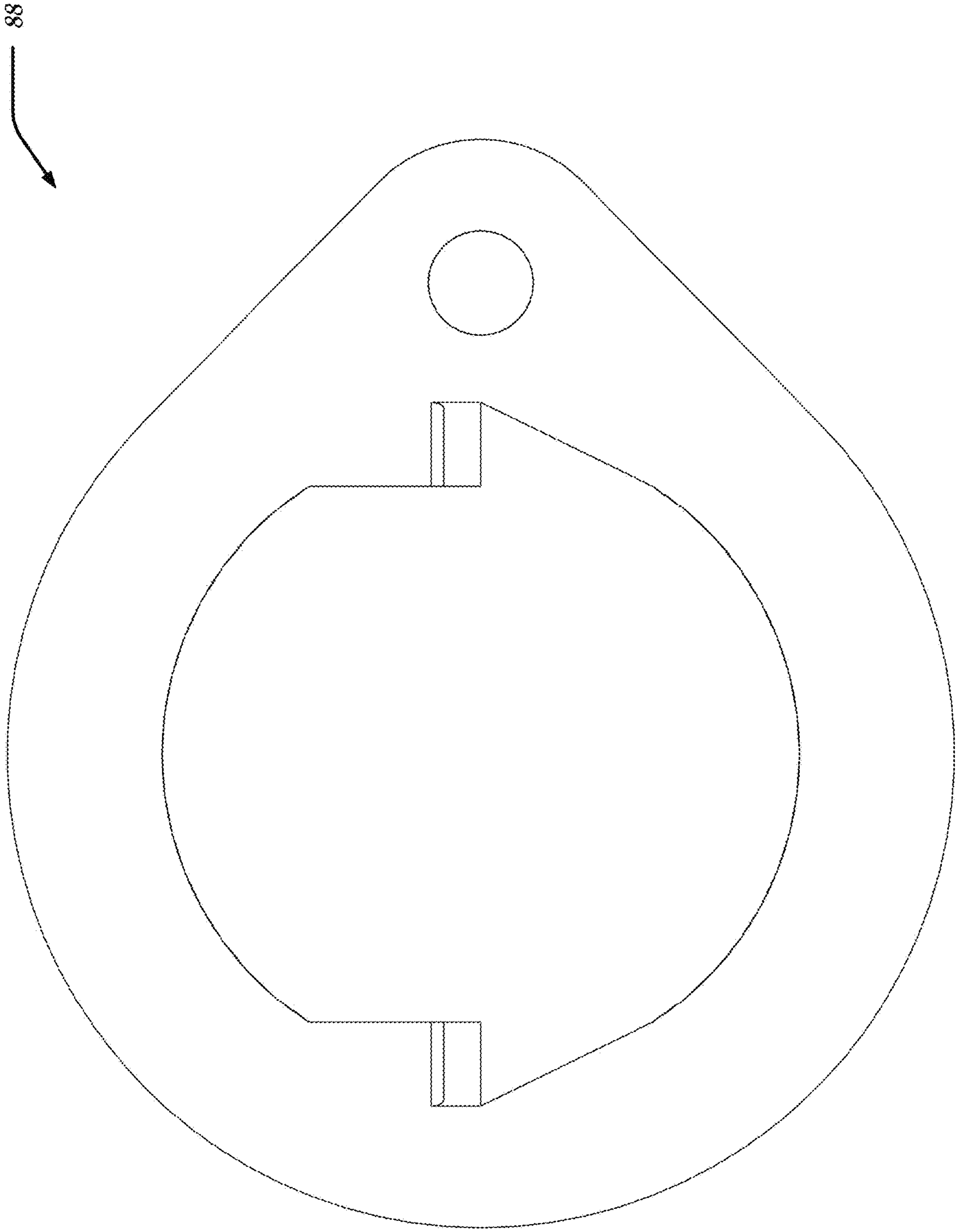
Figure 22:
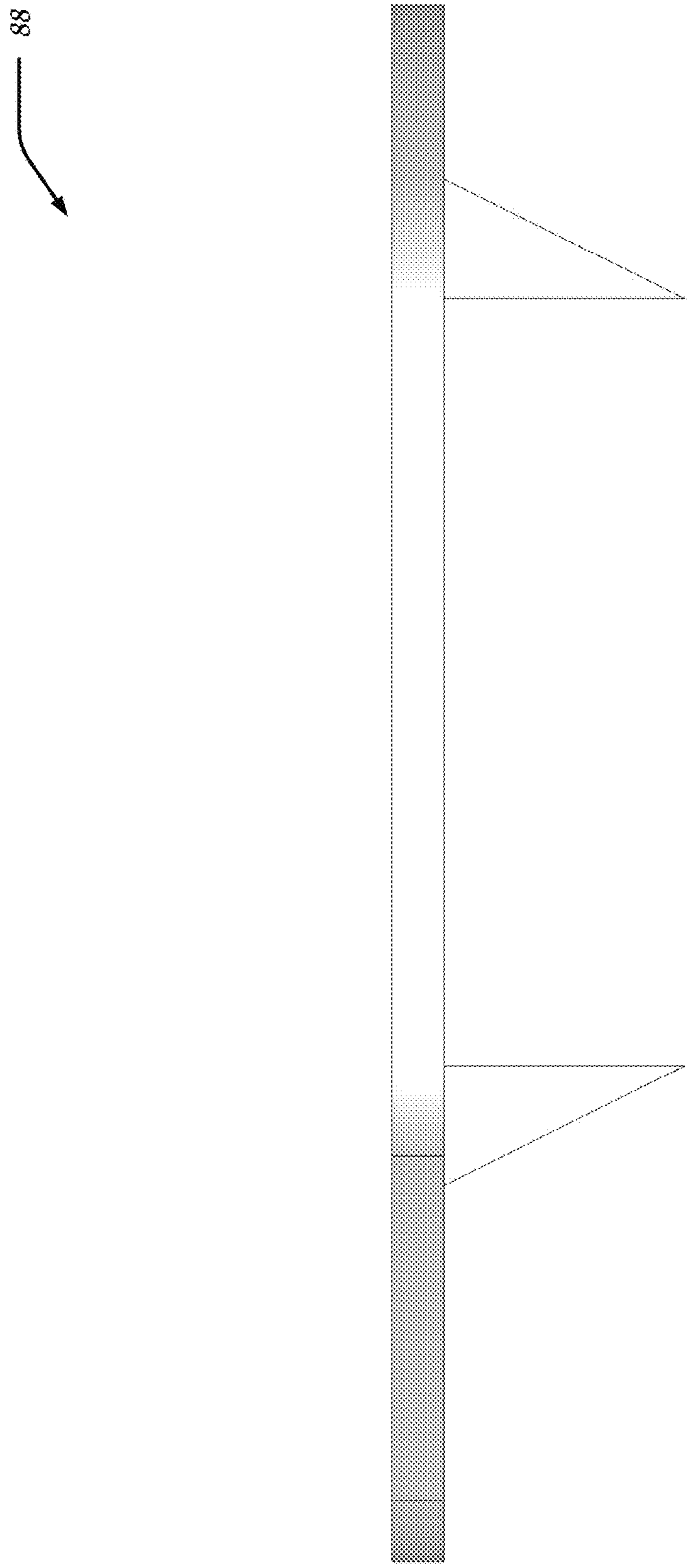
FIGS. 22 and 23 are isometric bottom views of the washer.
Figure 23:
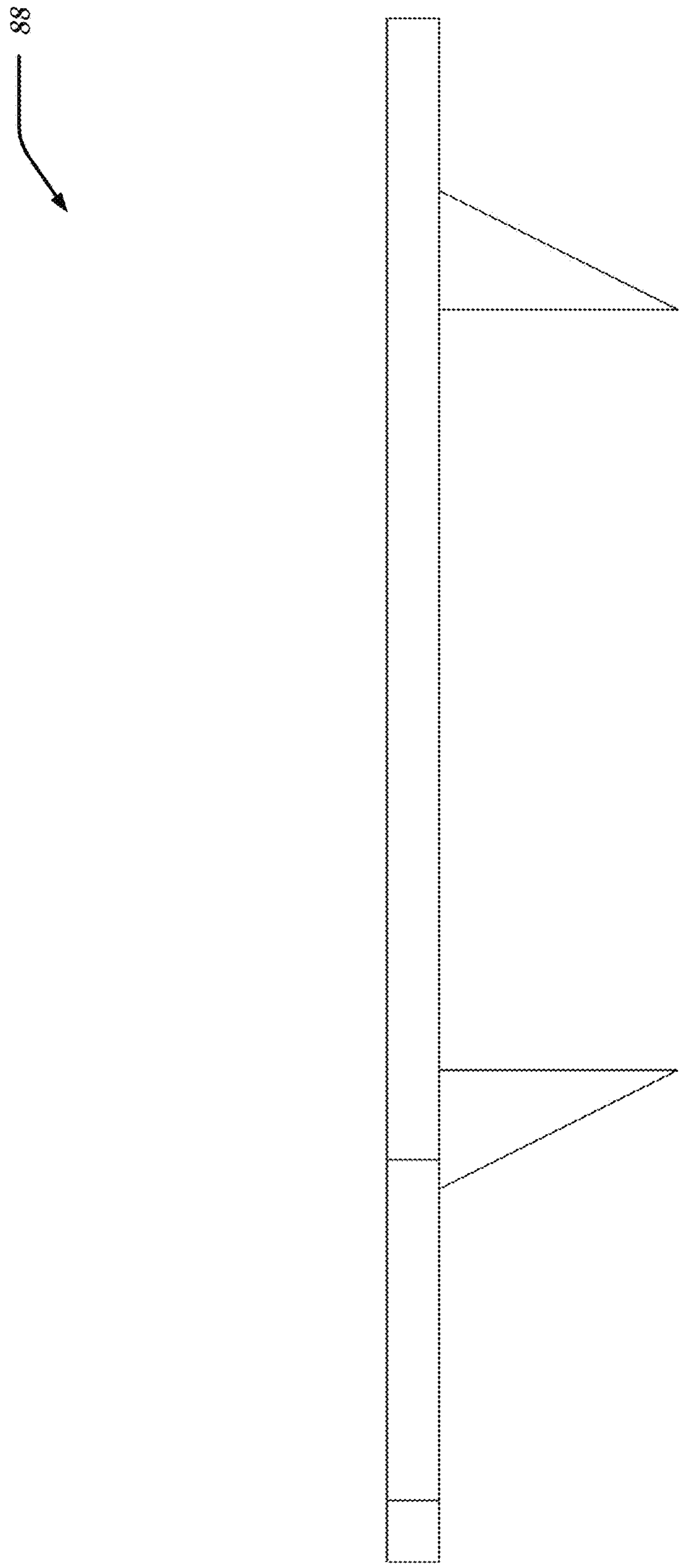

As shown in FIGS. 2 and 3, the plug 12 defines a circumferential groove 42 that, in some embodiments, is located rearward of the tumblers. The groove 42 encircles the exterior of the plug 12 and has a depth less than the radius of the plug 12. As shown in FIG. 3, the housing 14 defines two spaced-apart holes 44, 46 through an upper side of the housing 14 that are separated by a distance similar to the narrowed diameter of the plug 12 at the circumferential groove 42. In some embodiments, the housing 14 also defines two spaced-apart holes 48, 50 at a lower side of the housing 14 that are separated by a distance that is the same as or within 5, 10, or 20 percent of the distance between the holes 44, 46. The housing 14 has a threaded exterior surface 52 that extends throughout the entire length of or within 5, 10, 20, 30, or 50 percent of the housing 14. The outer surface of the housing 14 defines a clearance slot 54 that joins the holes 44, 46. A retainer clip 56 is configured to retain the plug 12 within the longitudinal hole of the housing 14. As shown in FIG. 7, the retainer clip 56 defines two spaced-apart prongs 70, 72. The prongs 70, 72 downwardly project from and are connected to each other with a cross member 74. The diameter of each of the prongs 70, 72 is less than the diameters of the holes 44-50 in the housing 14. The length of each of the prongs 70, 72 is greater than the distance between the top of the hole 44 and the top of the hole 48 and less than the distance between the top of the hole 44 and the bottom of the hole 48. Accordingly, the prongs 70, 72 extend through respective ones of the holes 44, 46, into the circumferential groove 42, and partially through respective ones of the holes 48, 50 while the cross member 74 resides in the slot 54, thereby facilitating retaining the plug 12 in the housing 14.

The prongs 70, 72 are oriented transverse to each other when no external force is applied to the prongs 70, 72, which contrasts the positional relationships between the holes 44-50 that receive the prongs 70, 72. The central axes of the holes 44, 48 are concentric with the central axes of the holes 46, 50 while the central axes of the holes 46, 50 are concentric with each other. The holes 48, 50 are closer to each other than the distal ends of the prongs 70, 72 when no external force is applied to them. Accordingly, the retainer clip 56 is configured to retain itself against the force of gravity in the housing 14 when inserted through the holes 44, 46, intro registry with the groove 44, and partially through the holes 48, 50 regardless of the orientation of the housing 14 (see FIG. 7), thereby facilitating simplifying installation of the cam lock 10 in the cabinet.

As shown in FIG. 4, the adapter 18 has an adapter-housing interface 76, and the rear end portion of the cylindrical housing 14 is configured to prevent the adapter-housing interface 76 from exiting through the rear of the housing 14. As shown in FIG. 3, the adapter 18 has a front end portion 78 that has a greater diameter than the diameter of the adapter-cam interface 22 and, in some embodiments, greater than the diameter of a middle portion disposed between the front end portion 78 and the adapter-cam interface 22 such that the rear face of the front end portion 78 defines the adapter-housing interface 76. As also shown in FIG. 3, the rear end portion of the housing 14 defines a flange 80 that extends radially inward by a distance that is less than a difference between the radius of the front end portion 78 of the adapter 18 and the radius of the adapter-cam interface 22 and, in some embodiments, less than a difference between the radius of the front end portion 78 of the adapter 18 and the radius of the middle portion of the adapter 18, such that the flange 80 abuts the adapter-housing interface 76 when the adapter 18 is disposed in the housing 14, as shown in FIG. 4. Accordingly, retention of the plug 12 in the housing 14 by the retainer clip 56 retains both the plug 12 and the adapter 18 in the housing 14, thereby facilitating simplifying installation of the cam lock 10 in the cabinet.

Figure 1:
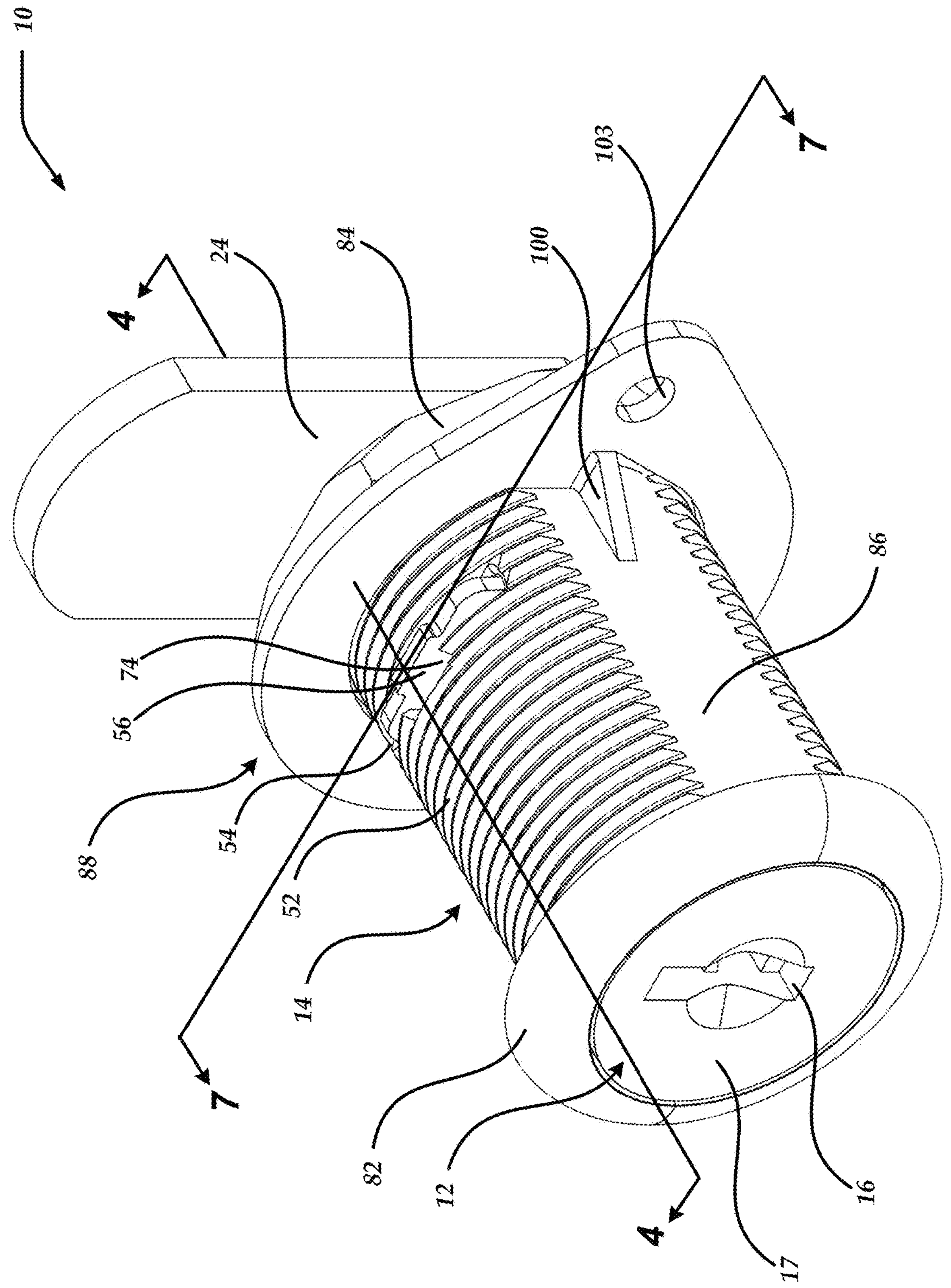
FIG. 1 is an isometric view of a lock employing the concept of the present invention.

As shown in FIG. 1, the housing 14 has an enlarged diameter at its front end portion to define an outwardly extending flange 82 that cooperates with a threaded fixing nut 84 to fix the lock 10 axially with respect to the cabinet drawer or door. As shown in FIGS. 1-3, the outer surface of the housing 14 defines at least one flat side 86 that extends the entire length of or within 5, 10, 20, 30, or 50 percent of the length of the housing 14 to prevent the housing 14 from rotating when installed in an oblong hole, such as in a cabinet drawer or door. In some embodiments, the exterior of the housing 14 is symmetrical about a vertical plane that extends along the longitudinal axis of the housing 14 such that the housing has a second flat side (not shown) opposite the flat side 86.

As shown in FIGS. 1 and 2, the lock 10 in some embodiments includes a spur washer 88 that defines a hole that is configured to receive the housing 14. The hole in the washer 88 has at least as many flat sides as the housing 14, with the flat sides of the washer 88 being configured to interface with the flat sides of the housing 14, as shown in FIG. 1. The washer 88 has a spur 100 and, in some embodiments, two spurs 100, 102 (see FIG. 2) that extend forward from the main body of the washer 88 and generally parallel to the longitudinal axis of the housing 14. When disposed between the cabinet drawer or door and the nut 84, tightening the nut 84 drives the spurs 100, 102 into the cabinet drawer or door. Accordingly, the flat sides of the washer 88 and its spurs 100, 102 further prevent the housing 14 from rotating relative to the cabinet. After the nut 84 is tightened to drive the spurs 100, 102 into the cabinet drawer or door, a fastener (not shown) is preferably driven through a fastener hole 103 defined by the washer 88 into the cabinet drawer or door. The hole 103 is preferably positioned such that a head of the fastener drive through the hole 103 interferes with the ability of the nut 84 to rotate on the cylinder housing 14, thereby preventing the nut 84 from loosening on or disengaging from the housing 14. The diameter of the cross member 74 is less than the distance from the bottom of the clearance slot 54 to the innermost position in the threads of the threaded exterior surface 52 of the housing 14 to facilitate the washer 88 and the nut 84 moving over the retainer clip 56.

As shown in FIGS. 2-4, the plug 12 has an enlarged diameter front end portion that prevents the plug 12 from receding too far into the housing 14. As shown in FIG. 3, the outer surface of the plug 12 defines a plug-housing interface 104, and the housing 14 has an inner surface that defines a housing-plug interface 106. The plug-housing interface 104 and the housing-plug interface 106 are configured to cooperatively provide tactile feedback to a person inserting the plug 12 into the housing 14 to communicate to the person whether the plug 12 has been inserted at the correct orientation relative to the housing 14. For example, the plug-housing interface 104 may include a projection that extends radially outward from the plug 12 while the housing-plug interface 106 includes a recess that is configured to receive the plug-housing interface 104 such that the plug-housing interface 104 is free to rotate approximately 90 degrees in the housing 14 to facilitate rotating the plug 12 in the housing, but the plug 12 is prevented from being fully received in or rotating in the housing 14 if the plug-housing interface 104 is not received in the housing-plug interface 106, thereby facilitating simplifying assembly of the cam lock 10.

As best seen in FIG. 3, the longitudinally extending channels 107*a*-107*d* defined by the inner surface of the housing 14 are configured to receive the wafer tumblers in the locked configuration and thereby prevent rotation of the plug 12 in the housing 14. The channels 107*a*-107*d* extend to the front edge of the inner surface of the housing 14 and thus enable the plug 12 to be slid longitudinally into or out from the housing 14 while the wafer tumblers are in the locked configuration. Insertion into the plug 12 of a key cut for the particular combination of wafer tumblers installed in the plug 12 retracts the wafer tumblers into the plug 12, which removes the wafer tumblers from the channels 107*a*-107*d* and thus enables the plug 12 to rotate in the housing 12 about the longitudinal axis of the housing 12.

As shown in FIG. 3, the top of the plug 12 is open to facilitate inserting the tumblers into the keyway 16. The inner surface of the plug 12 defines spacers, such as spacers 108, 110, that retain the tumblers in the slots defined by adjacent pairs of spacers. The spacers on one side of the keyway 16, such as the spacer 108, are L-shaped in some embodiments. The spacers on the opposite side of the keyway 16, such as the spacer 110, are straight in some embodiments. The left and right sides of the keyway 16 are connected with bridge members in some embodiments, such as the bridge member 112, and gaps between the bridge members extend from the keyway 16 to the exterior of the plug 12 in some embodiments. The spacers on one side of the keyway 16, such as the spacer 108, extend all the way down to the bridge members in some embodiments. In some embodiments, the other side of the plug 12 defines a hole 114 that extends from the keyway 16 to the exterior of the plug 12 such that the straight spacers, such as the spacer 110, do not extend all the way down to the bridge members (see FIGS. 3 and 4).

The cam lock 10 facilitates enhancing security for cabinets as explained above and also facilitates an improved method of packaging cam locks in a manner that reduces costs and simplifies subsequent installation into cabinets. An inventory of cam lock parts is provided or stored in a warehouse. The inventory includes multiple cams such as the cam 24, multiple plugs such as the plug 12, multiple adapters of different lengths such as the adapter 18 and the adapter 130 shown in FIG. 5, and multiple cylinder housings of different lengths such as the cylinder housing 16, the cylinder housing 132 shown in FIG. 5, and the cylinder housing 134. In some embodiments, the inventory also includes multiple uniformly sized retainer clips such as the retainer clip 56, multiple uniformly sized nuts such as the nut 84, multiple uniformly sized washers such as the washer 148 and the washer 88, and fasteners of different lengths such as the fastener 28 shown in FIG. 4, the fastener 164 shown in FIG. 5, and the fastener 140 shown in FIG. 6. Different cam lock part combinations may be selected from the inventory and packaged together to provide packaged cam locks for cabinets having drawers or doors of different thicknesses while each cam lock uses the same length plug, thereby facilitating reducing the part count in the inventory for the number of length and key combinations available from the inventory.

A packager determines a thickness of a first cabinet drawer or door in which a first cam lock is intended to be installed and, based on the determined thickness, selecting a cylinder housing from the inventory, an adapter from the inventory, and a fastener from the inventory. For example, an employee of the warehouse that stores the inventory of cam lock parts may review an order sheet that lists the cam lock sizes to be packaged, and the employee may select parts for cam locks based on the ordered sizes indicated on the order sheet. As another example, the employee determines that inventory in the warehouse is running low for a given thickness or range of thicknesses for cabinet drawers or doors, and the employee may select parts for cam locks based on such determined thickness for cabinet drawers or doors in which those cam locks are intended to be installed. The packager selects a cam, a plug, and a retainer clip without regard for the determined thickness. For example, for a thin cabinet drawer or door or for an inventory intended for thin cabinet drawers or doors, the packager may select the cylinder housing 134 shown in FIG. 6 having a short length 136, no adapter because the plug 12 has the same length 138 as or within 5, 10, or 20 percent of the length 136 of the housing 134, and a short fastener 140 that has a length sufficient to clamp the cam 24 and a washer 148 against the plug 12 to provide a short cam lock 141. For a medium-thickness cabinet drawer or door or for an inventory intended for medium-thickness cabinet drawers or doors, the packager selects the housing 14 shown in FIG. 4 having a length 142 longer than the short housing 134, the adapter 18 having a medium length 146 that in combination with the length of the plug 12 equals or is within 5, 10, or 20 percent of the length 142 of the housing 14, and the fastener 28 having a length that is sufficient to clamp the adapter 18, the cam 24, and the washer 148 against the plug 12. For a cabinet drawer or door having a large thickness or for an inventory for large-thickness cabinet drawers or doors, the packager selects the housing 132 shown in FIG. 5 having a length 160 that is longer than the medium housing 14, the adapter 130 having a length 162 that in combination with the length of the plug 12 equals or is within 5, 10, or 20 percent of the length 142 of the housing 132, and a fastener 164 having a length that is sufficient to clamp the adapter 130, the cam 24, and the washer 148 against the plug 12 to provide a long cam lock 166.

Figure 6:
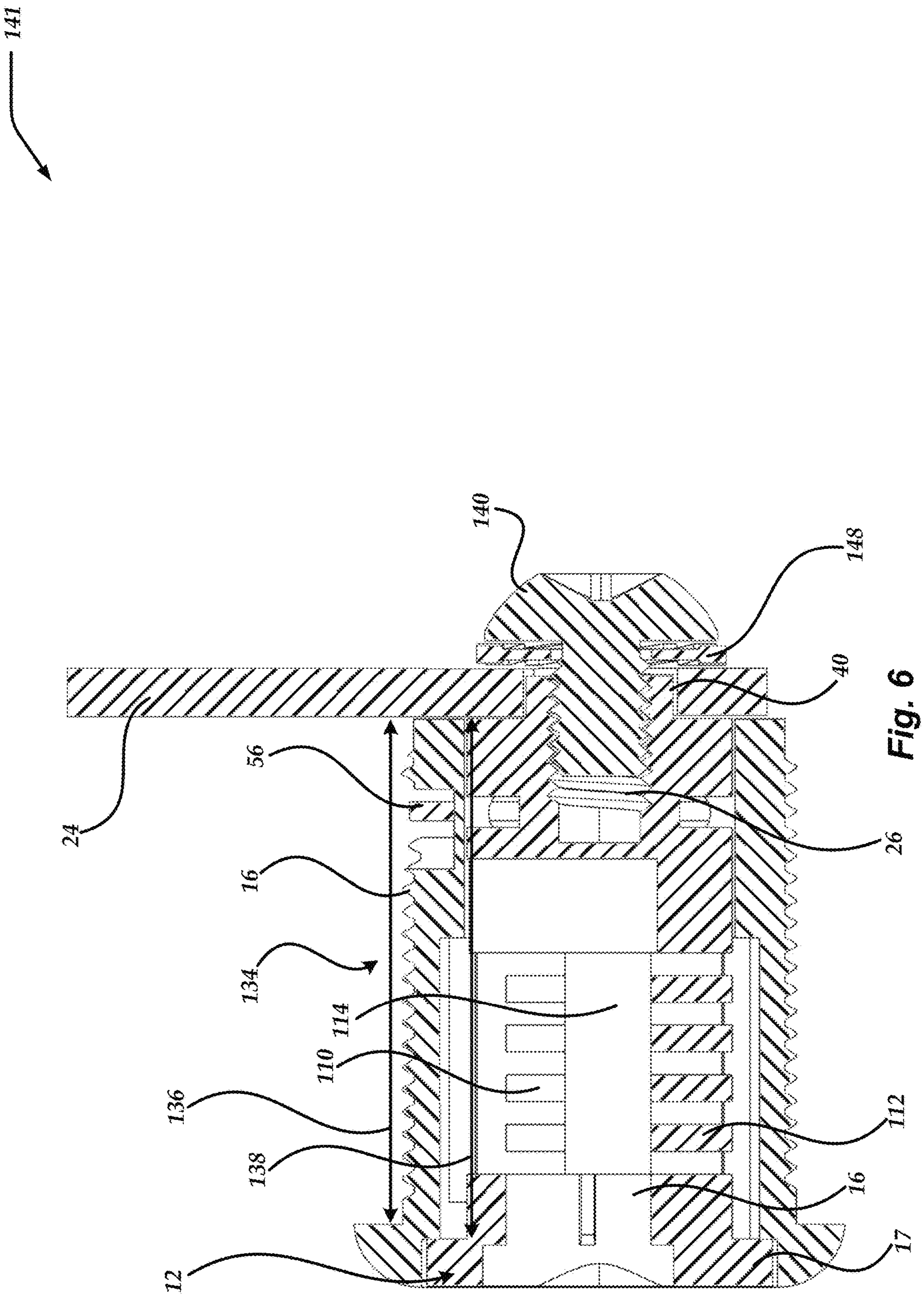
FIG. 6 is a right elevational, sectional view of a further embodiment of a lock employing the concept of the present invention.

For the short lock 141 shown in FIG. 6, the packager inserts a key (not shown) for the plug 12 into the plug 12, inserts the plug 12 into the housing 134, and secures the plug 12 in the housing 134 by inserting the retaining clip 56 through the holes 44, 46 into registry with the groove 42 of the plug 12. For the medium and long locks 10, 166 shown in FIGS. 4 and 6, the packager inserts the respective adapters 18, 130 prior to inserting the plug 12 (for example, placing the adapter 18 or 130 on the plug 12 while holding the plug 12 with its longitudinal axis being disposed vertically, and placing the adapter 18 or 130 on the upward facing plug-cam interface 40 prior to dropping the housing 14 or 132 over the adapter 18 or 130 and the plug 12) and then inserting the retaining clip through the housing 14 or 132 to secure the plug 12 and thereby retain both the plug 12 and the adapter 18 or 130 in the housing 14 or 132. The packager packages the cam locks 10, 141, 166 into manufacturer's or seller's packaging (not shown) for shipment to a store or installer while the plug 12 and, for the medium and long locks 141, 166, with the adapters 18, 130 retained in the housings 14, 132, 134. Accordingly, installation of the cam locks 10, 141, 166 is simplified for the installer after opening the packaging.

The packaged cam locks 10, 141, 166 are provided to the installer (for example, cabinet maker or locksmith) while in the packaging. The installer unpacks one of the cam locks 10, 141, 166, and without inserting the key into the keyway 16 of the plug 12, inserts the cylinder housing 14, 132, or 134 through a hole defined by the cabinet drawer or door while the plug 12 and, for the medium and long locks 10, 166, the adapter 18 or 130 are retained in the housing 14, 132, or 134. In some embodiments, the installer screws the nut 84 onto the housing 14, 132, or 134, after placing the washer 88 over the housing 14, 132, or 134. The installer then couples the cam 24 to the plug 12 or the adapter 18 or 130 and secures the cam 24 by screwing the fastener 28, 140, or 164 into the plug 12. The plug 12 and adapter 18 or 130 are configured to permit coupling the cam 24 in multiple orientations such that the plug 12 can be installed in the housing 14, 132, or 134 without prior knowledge of the handing or orientation of the cabinet drawer or door. Accordingly, the method of packaging and the configuration of the lock facilitate reduced part counts in the inventory and simplified installation in cabinets while overcoming the shortcomings of known cam locks.

The term "transverse" as used herein means a non-parallel orientation and includes but is not limited to a perpendicular orientation. The term "configured" as used herein means an element being one or more of sized, dimensioned, positioned, or oriented to achieve or provide the recited function or result. The term "directly coupled" as used herein means a component that contacts (for example, when bolted) or is welded to another component. The term "indirectly coupled" as used herein means a component that is coupled to one or more other components that are coupled to a second component or one or more further components that are coupled to the second component. The term "coupled" should be understood to disclose both direct and indirect coupling of components or elements that are described as being coupled to each other.

While the preferred embodiment of the invention has been illustrated and described, as noted above, many changes can be made without departing from the spirit and scope of the invention. For example, each disclosure of an element or component having a feature or characteristic is intended to also disclose the element or component as being devoid of that feature or characteristic, unless the principles of the invention clearly dictate otherwise. Accordingly, the scope of the invention is not limited by the disclosure of the preferred embodiments. Instead, the invention should be determined entirely by reference to the claims that follow. Moreover, each feature, characteristic, element, or component described herein may be implemented in combination with one or more other features, characteristics, elements, or components described herein. For example, one or more of the features, characteristics, or elements of the lock 10 may be implemented in combination with one or more other features, characteristics, or elements described herein. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (for example, "The method of any one of the preceding or subsequent claims . . . ."). This disclosure is also intended to disclose the subject matter of any one of the dependent claims, as if it was an independent claim, with or without all or a portion of the subject matter of the original independent claim(s) or any other subject matter disclosed herein.

We claim:

1. A method for packaging a cam lock for installation in a cabinet, the method comprising:

providing an inventory of cam lock parts, the inventory having:

- a plurality of cams;
- a plurality of plugs, each plug having a keyway and a plurality of wafer tumblers in communication with the keyway, wherein each one of the plurality of plugs is defined by a plug length, and wherein each one of the plurality of plugs has the same plug length;
- a plurality of adapters configured to couple to each of the cams and each of the plugs, each adapter having a different length relative to each other adapter; and
- a plurality of cylinder housings configured to receive each plug, each cylinder housing having a different length relative to each other cylinder housing, each cylinder housing that is longer than the plugs being configured to receive one of the adapters;

determining a first thickness of a first cabinet drawer or door in which a first cam lock is intended to be installed;

selecting a first cam from the plurality of cams;

selecting a first plug from the plurality of plugs;

selecting a first adapter from the plurality of adapters based on the first determined thickness;

selecting a first cylinder housing from the plurality of cylinder housings based on the first determined thickness;

inserting the first adapter into the first cylinder housing;

inserting the first plug into the first cylinder housing;

securing the first plug in the first cylinder housing to retain both the first adapter and the first plug in the first cylinder housing; and packaging the first cam, the first plug, the first adapter, and the first cylinder housing into a first packaging while the first plug and the first adapter are disposed in the first cylinder housing to provide a first packaged cam lock, whereby installation of the first packaged cam lock in the first cabinet drawer or door is simplified;

determining a second thickness of a second cabinet drawer or door in which a second cam lock is intended to be installed, the second thickness being greater than the first thickness;

selecting a second cam from the plurality of cams;

selecting a second plug from the plurality of plugs;

selecting a second adapter from the plurality of adapters based on the second determined thickness, the second adapter being longer than the first adapter;

selecting a second cylinder housing from the plurality of cylinder housings based on the second determined thickness, the second cylinder housing being longer than the first cylinder housing;

inserting the second adapter into the second cylinder housing;

inserting the second plug into the second cylinder housing;

securing the second plug in the second cylinder housing to retain both the second adapter and the second plug in the second cylinder housing; and packaging the second cam, the second plug, the second adapter, and the second cylinder housing into a second packaging while the second plug and the second adapter are disposed in the second cylinder housing to provide a second packaged cam lock, whereby installation of the second packaged cam lock in the second cabinet drawer or door is simplified.

2. A method for packaging a cam lock for installation in a cabinet, the method comprising:

providing an inventory of a plurality of cam lock components, the inventory of plurality of cam lock components having:

a plurality of cams;

a plurality of plugs, each plug having a keyway and a plurality of wafer tumblers in communication with the keyway, wherein each one of the plurality of plugs is defined by a plug length, and wherein each one of the plurality of plugs has the same plug length;

a plurality of first adapters configured to couple to one of the cams and one of the plugs, wherein each first adapter is defined by a first adapter length; and a plurality of first cylinder housings configured to receive one of the plugs and one of the first adapters, wherein each first cylinder housing is defined by a first cylinder housing length;

a plurality of second adapters configured to couple to one of the cams and one of the plugs, wherein each second adapter is defined by a second adapter length that is different from the first adapter length; and a plurality of second cylinder housings configured to receive one of the plugs and one of the second adapters, wherein each second cylinder housing is defined by a second cylinder housing length that is different from the first cylinder housing length;

selecting a plurality of first cam lock components from the plurality of cam lock components, wherein the plurality of first cam lock components define a first cam lock, and wherein the selecting of the plurality of first cam lock components includes:

selecting a first cam from the plurality of cams;

selecting a first plug from the plurality of plugs;

selecting a first adapter from the plurality of first adapters based on a first thickness of a first cabinet drawer or door;

selecting a first cylinder housing from the plurality of cylinder housings based on the first thickness; and packaging the plurality of first cam lock components of the first cam lock into a first packaging, wherein the first plug and the first adapter are configured to be disposed in the first cylinder housing, wherein a length of the packaged first cam lock is defined by a first cam lock length that corresponds to the first thickness of the first cabinet drawer or door, and whereby installation of the packaged first cam lock in the first cabinet drawer or door is simplified;

selecting a plurality of second cam lock components from the plurality of cam lock components, wherein the plurality of second cam lock components define a second cam lock, and wherein the selecting of the plurality of the second components includes:

selecting a second cam from the plurality of cams;

selecting a second plug from the plurality of plugs;

selecting a second adapter from the plurality of second adapters based on a second thickness of a second cabinet drawer or door, wherein the second thickness is different from the first thickness;

selecting a second cylinder housing from the plurality of second cylinder housings based on the second thickness; and packaging the plurality of second cam lock components of the second cam lock into a second packaging, wherein the second plug and the second adapter are configured to be disposed in the second cylinder housing, wherein a length of the packaged second cam lock is defined by a second cam lock length that corresponds to the second thickness of the second cabinet drawer or door, and whereby installation of the second packaged cam lock in the second cabinet drawer or door is simplified.

3. The method of claim 2, wherein the selecting the plurality of first cam lock components further includes:

inserting the first adapter into the first cylinder housing;

inserting the first plug into the first cylinder housing; and securing the first plug in the first cylinder housing to retain both the first adapter and the first plug in the first cylinder housing, and wherein the selecting the plurality of second cam lock components further includes:

inserting the second adapter into the second cylinder housing;

inserting the second plug into the second cylinder housing; and securing the second plug in the second cylinder housing to retain both the second adapter and the second plug in the second cylinder housing.

4. The method of claim 3, wherein inserting the first plug into the first cylinder housing includes inserting the first plug into the first cylinder housing without inserting a key or tool into the keyway of the first plug.

5. The method of claim 4, wherein securing the first plug in the first cylinder housing includes inserting a retainer clip through the first cylinder housing in a direction that is transverse to a longitudinal axis of the first plug so as to register with the first plug in the first cylinder housing, whereby installation of the first packaged cam lock in the first cabinet drawer or door is simplified.

6. The method for claim 5, wherein each plug has an outer surface that defines a plug-housing interface, and each of the first cylinder housings and each of the second cylinder housings have an inner surface that defines a housing-plug interface, wherein each plug-housing interface and each housing-plug interface cooperatively prevent each plug from being fully received in or rotating in each of the first cylinder housings and each of the second cylinder housings unless inserted in a predefined orientation relative to each of the first cylinder housings and each of the second cylinder housings, whereby assembly of the first cam lock is simplified.

7. The method of claim 6, wherein each of the first cylinder housings and each of the second cylinder housings has a front end portion and a rear end portion, each front end portion of each of the first cylinder housings and each of the second cylinder housings is configured to prevent each plug from sliding entirely through each of the first cylinder housings and each of the second cylinder housings, and each rear end portion of each of the first cylinder housings and each of the second cylinder housings that is longer than the plugs is configured to prevent the adapters from being inserted entirely through the rear end portion, whereby installation of the first packaged cam lock in the first cabinet drawer or door is simplified.

8. The method of claim 7, wherein each plug has a plug-cam interface, and each of the first adapters and each of the second adapters have a plug-adapter interface and an adapter-cam interface, each plug-adapter interface being configured to couple to each plug-cam interface, each adapter-cam interface being configured to couple to each cam and having a same cross-sectional shape and dimensions as each plug-cam interface, whereby the part count in the inventory is reduced.

9. A method for installing a cam lock in a cabinet, the method comprising:

providing a packaged cam lock in a packaging, the packaged cam lock having;

a cam;

a plug selected from a plurality of plugs, wherein each one of the plurality of plugs is defined by a plug length, wherein each one of the plurality of plugs has the same plug length, and wherein each one of the plurality of plugs has a keyway and a plurality of wafer tumblers in communication with the keyway;

a first adapter configured to couple to the cam and the plug, wherein the first adapter is defined by a first adapter length;

a second adapter configured to couple to the cam and the plug, wherein the second adapter is defined by a second adapter length that is different from the first adapter length;

a first cylinder housing configured to receive the plug and the first adapter, wherein the plug and the first adapter are configured to be retained in the first cylinder housing, wherein the first cylinder housing is defined by a first cylinder housing length;

a second cylinder housing configured to receive the plug and the second adapter, wherein the plug and the second adapter are configured to be retained in the second cylinder housing, wherein the second cylinder housing is defined by a second cylinder housing length that is different from the first cylinder housing length;

unpacking the cam lock from the packaging;

determining whether a thickness a cabinet drawer or door of the cabinet is one of a first thickness or a second thickness;

in response to determining that the cabinet drawer or door is the first thickness and without inserting a key into the keyway, inserting the first cylinder housing through a hole defined by the cabinet drawer or door while the plug and the first adapter are retained in the fit cylinder housing, wherein the first cylinder housing length corresponds to the first thickness of the cabinet drawer or door; and coupling the cam to the first adapter or the plug while the first cylinder housing extends through the hole; and in response to determining that the cabinet drawer or door is the second thickness and without inserting a key into the keyway, inserting the second cylinder housing through the hole defined by the cabinet drawer or door while the plug and the second adapter are retained in the second cylinder housing, wherein the second cylinder housing length corresponds to the second thickness of the cabinet drawer or door; and coupling the cam to the second adapter or the plug while the second cylinder housing extends through the hole.

10. The method of claim 9, wherein a retainer clip is configured to extend through the first cylinder housing or the second cylinder housing in a direction transverse to a longitudinal axis of the plug into registry with the plug, wherein the retainer clip in the first cylinder housing retains both the first adapter and the plug in the first cylinder housing when the first cylinder housing is to be inserted through the hole, wherein the retainer clip in the second cylinder housing retains both the second adapter and the plug in the second cylinder housing when the second cylinder housing is to be inserted through the hole, and whereby installation of the cam lock in the cabinet drawer or door is simplified.

11. The method of claim 10, further comprising:

after inserting the first cylinder housing through the hole defined by the cabinet drawer or door, and before coupling the cam to the first adapter or the plug, placing a washer over a rear end portion of the first cylinder housing, the washer defining a first hole that is configured to receive the first cylinder housing and a second hole that is configured to receive a fastener, the first cylinder housing having an outer surface that defines a flat region along the first cylinder housing length of the first cylinder housing, the first hole of the washer having a flat side that is configured to interface with the flat region, the washer having a spur that is configured to be driven into the cabinet drawer or door;

screwing a nut onto the rear end portion of the first cylinder housing to drive the washer toward the hole defined by the cabinet drawer or door; and driving the fastener through the second hole of the washer and into the cabinet drawer or door to position a head of the fastener to interfere with rotation of the nut to prevent unscrewing the nut from the rear end portion of the first cylinder housing, whereby the first cylinder housing is prevented from rotating in the cabinet drawer or door after installation of the cam lock in the cabinet drawer or door.

12. The method of claim 11, wherein the plug has an outer surface that defines a plug-housing interface, wherein the first cylinder housing has an inner surface that defines a housing-plug interface, wherein the plug-housing interface and the housing-plug interface cooperatively prevent the plug from rotating in the first cylinder housing unless the plug is inserted in a predefined orientation relative to the first cylinder housing, whereby assembly of the cam lock is simplified.

13. The method of claim 12, wherein the first cylinder housing has a front end portion opposite the rear end portion, the front end portion of the first cylinder housing is configured to prevent the plug from sliding entirely through the first cylinder housing, and the rear end portion of the first cylinder housing is configured to prevent the first adapter from being inserted entirely through the rear end portion, whereby installation of the cam lock in the cabinet drawer or door is simplified.

14. The method of claim 13, wherein the plug has a plug-cam interface, and the first adapter has a plug-adapter interface and an adapter-cam interface, the plug-adapter interface being configured to couple to the plug-cam interface, the adapter-cam interface being configured to couple to the cam and having a same cross-sectional shape and dimensions as the plug-cam interface, whereby a part count in a manufacturer's or seller's inventory is reduced.

15. A cam lock system for cabinets, the cam lock system comprising:

a cam;

a plug selected from a plurality of plugs, wherein each one of the plurality of plugs is defined by a plug length, wherein each one of the plurality of plugs has the same plug length, and wherein each one of the plurality of plugs has a keyway and a plurality of wafer tumblers in communication with the keyway;

a first adapter configured to couple to the cam and the plug, wherein the first adapter is defined by a first adapter length;

a second adapter configured to couple to the cam and the plug, wherein the second adapter is defined by a second adapter length;

a first cylinder housing configured to receive the plug and the first adapter, the plug being insertable into and removable from the second cylinder housing without inserting a key or tool into the keyway of the plug, wherein the first cylinder housing is defined by a first cylinder housing length, and wherein the first adapter length corresponds to a first thickness of the cabinet;

a second cylinder housing configured to receive the plug and the second adapter, the plug being insertable into and removable from the second cylinder housing without inserting a key or tool into the keyway of the plug, wherein the second cylinder housing is defined by a second cylinder housing length that is different from the first cylinder housing length, and wherein the second adapter length corresponds to a second thickness of the cabinet that is different from the first thickness; and a retainer clip configured to:

extend through the fits cylinder housing in a direction transverse to a longitudinal axis of the plug into registry with the plug after the plug and first adapter are inserted into the first cylinder housing to thereby retain both the plug and the first adapter in the first cylinder housing; and extend through the second cylinder housing in a direction transverse to the longitudinal axis of the plug into registry with the plug after the plug and second adapter are inserted into the second cylinder housing to thereby retain both the plug and the second adapter in the second cylinder housing, whereby installation of the cam lock using the first cylinder housing and the first adapter in the cabinet is simplified when the cabinet is of the first thickness, and whereby installation of the cam lock using the second cylinder housing and the second adapter in the cabinet is simplified when the cabinet is of the second thickness.

16. The cam lock of claim 15, wherein the plug has an outer surface that defines a plug-housing interface, and the first cylinder housing has an inner surface that defines a housing-plug interface, wherein the plug-housing interface and the housing-plug interface cooperatively prevent the plug from being fully received in or rotating in the first cylinder housing unless the plug is inserted in a predefined orientation relative to the first cylinder housing, whereby assembly of the cam lock is simplified.

17. The cam lock of claim 16, further comprising a washer that defines a first hole configured to receive a rear end portion of the first cylinder housing and a second hole configured to receive a fastener, the first cylinder housing having an outer surface that defines a flat region along a length of the first cylinder housing corresponding to the first cylinder housing length, the first hole of the washer having a flat side that is configured to interface with the flat region, the washer having a spur that is configured to be driven into the cabinet when the washer is placed over the rear end portion of the first cylinder housing after inserting the first cylinder housing through a hole in the cabinet, the second hole of the washer configured to position a head of a fastener that extends through the second hole so as to interfere with unscrewing a nut from the rear end portion of the first cylinder housing, whereby the first cylinder housing is prevented from rotating in the cabinet after installation in the cabinet.

18. The cam lock of claim 17, wherein the first cylinder housing has a front end portion opposite the rear end portion, the front end portion of the first cylinder housing is configured to prevent the plug from sliding entirely through the first cylinder housing, and the rear end portion of the first cylinder housing is configured to prevent the first adapter from being inserted entirely through the rear end portion, whereby installation of the cam lock in the cabinet is simplified.

19. The cam lock of claim 18, wherein the plug has a plug-cam interface, and the first adapter has a plug-adapter interface and an adapter-cam interface, the plug-adapter interface being configured to couple to the plug-cam interface, the adapter-cam interface being configured to couple to the cam and having a same cross-sectional shape and dimensions as the plug-cam interface, whereby a part count in a manufacturer's or seller's inventory is reduced.

20. A cam lock system for a cabinet, the cam lock comprising:

a cam;

a plug selected from a plurality of plugs, wherein each one of the plurality of plugs is defined by a plug length, wherein each one of the plurality of plugs has the same plug length, and wherein each one of the plurality of plugs has a keyway and a plurality of wafer tumblers in communication with the keyway;

a first means for housing the plug, wherein the first means for housing the plug is defined by a first length that corresponds to a first thickness of the cabinet;

a first means for adapting the plug to the first length of the first means for housing the plug;

a second means for housing the plug, wherein the second means for housing the plug is defined by a second length that corresponds to a second thickness of the cabinet;

a second means for adapting the plug to the second length of the second means for housing the plug; and a means for retaining, wherein the means for retaining retains the plug and the first means for adapting in the first means for housing the plug, and wherein the means for retaining retains the plug and the second means for adapting in the second means for housing the plug, whereby installation of the cam lock using the first means for housing the plug in the cabinet of the first thickness is simplified, and whereby installation of the cam lock using the second means for housing the plug in the cabinet of the second thickness is simplified.

21. The cam lock of claim 20, wherein the means for retaining is configured to retain itself in the first means for housing against a force of gravity regardless of orientation of the first means for housing, whereby installation of the cam lock in the cabinet is simplified.

* * * * *